United States Patent
Tanaka et al.

(10) Patent No.: US 9,511,792 B2
(45) Date of Patent: Dec. 6, 2016

(54) STEERING DEVICE

(71) Applicants: JTEKT CORPORATION, Osaka-shi, Osaka (JP); TOYOTA JIDOSHA KABUSHIKI KAISHA, Toyota-shi, Aichi (JP)

(72) Inventors: Eiji Tanaka, Kitakatsuragi-gun (JP); Susumu Magaki, Tondabayashi (JP); Shigeru Hoshino, Toyota (JP); Shunsuke Nunomura, Kashihara (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/905,509

(22) PCT Filed: Jul. 17, 2014

(86) PCT No.: PCT/JP2014/068995
§ 371 (c)(1),
(2) Date: Jan. 15, 2016

(87) PCT Pub. No.: WO2015/008816
PCT Pub. Date: Jan. 22, 2015

(65) Prior Publication Data
US 2016/0176435 A1  Jun. 23, 2016

(30) Foreign Application Priority Data

Jul. 18, 2013 (JP) ................. 2013-149594
Sep. 12, 2013 (JP) ................. 2013-189507

(51) Int. Cl.
*B62D 1/19* (2006.01)
*B62D 1/189* (2006.01)

(52) U.S. Cl.
CPC ............. *B62D 1/195* (2013.01); *B62D 1/189* (2013.01)

(58) Field of Classification Search
CPC ............................... B62D 1/195; B62D 1/189
See application file for complete search history.

(56) References Cited

U.S. PATENT DOCUMENTS

| 5,899,116 A * | 5/1999 | Armstrong | ............. | B62D 1/195 |
| | | | | 188/376 |
| 9,010,806 B2 * | 4/2015 | Tanaka | ................... | B62D 1/195 |
| | | | | 280/777 |

(Continued)

FOREIGN PATENT DOCUMENTS

| JP | 2005-014832 A | 1/2005 |
| JP | 2008-018920 A | 1/2008 |

(Continued)

OTHER PUBLICATIONS

Oct. 7, 2014 International Search Report issued in International Patent Application No. PCT/JP2014/068995.

*Primary Examiner* — Drew Brown
(74) *Attorney, Agent, or Firm* — Oliff PLC

(57) ABSTRACT

A resin pin which is passed through a first resin-pin passing hole of a first plate, and a second resin-pin passing hole of a second plate to couple the second plate to a predetermined position of the first plate is sheared in a secondary collision, and causes the second plate to release from the predetermined position in a column movement direction. A slide plate which extends along the upper surface of the first plate has a resin-pin visual check hole. A highly hard collar is received by the second plate, placed in the first resin-pin passing hole, and fitted to a shaft portion of the resin pin. In the resin pin, axial elastic projections which apply a pressing and urging force to the slide plate are disposed at positions avoiding a range where, in a secondary collision, the resin-pin visual check hole is passed in the column movement direction.

6 Claims, 12 Drawing Sheets

(56) References Cited

U.S. PATENT DOCUMENTS

| | | | |
|---|---|---|---|
| 9,346,482 B2* | 5/2016 | Tanaka | B62D 1/195 |
| 9,359,002 B2* | 6/2016 | Tanaka | B62D 1/195 |
| 9,381,936 B2* | 7/2016 | Tanaka | B62D 1/195 |
| 2008/0012281 A1 | 1/2008 | Cho et al. | |
| 2008/0236326 A1* | 10/2008 | Matsui | F16F 7/123 |
| | | | 74/493 |
| 2008/0284150 A1 | 11/2008 | Yamada | |
| 2009/0249916 A1* | 10/2009 | Ridgway | B62D 1/192 |
| | | | 74/492 |
| 2012/0112443 A1* | 5/2012 | Arakawa | B62D 1/195 |
| | | | 280/777 |
| 2012/0169035 A1* | 7/2012 | Minamigata | B62D 1/195 |
| | | | 280/777 |
| 2012/0187669 A1 | 7/2012 | Minamigata et al. | |
| 2012/0267884 A1* | 10/2012 | Fujiwara | B62D 1/195 |
| | | | 280/777 |
| 2012/0291585 A1* | 11/2012 | Minamigata | B62D 1/195 |
| | | | 74/493 |
| 2012/0318092 A1* | 12/2012 | Kuroumaru | B62D 1/195 |
| | | | 74/492 |
| 2013/0133460 A1 | 5/2013 | Uesaka | |
| 2014/0053677 A1* | 2/2014 | Sakata | B62D 1/195 |
| | | | 74/493 |
| 2014/0246848 A1* | 9/2014 | Yachida | B62D 1/19 |
| | | | 280/777 |
| 2015/0069746 A1* | 3/2015 | Oishi | B62D 1/187 |
| | | | 280/775 |
| 2015/0090066 A1* | 4/2015 | Hoshino | B62D 1/195 |
| | | | 74/492 |
| 2015/0314802 A1 | 11/2015 | Tanaka et al. | |

FOREIGN PATENT DOCUMENTS

| | | |
|---|---|---|
| JP | 2008-308156 A | 12/2008 |
| JP | 2012-121538 A | 6/2012 |
| JP | 2013-112147 A | 6/2013 |
| JP | 2014-166841 A | 9/2014 |

* cited by examiner

STEERING DEVICE

TECHNICAL FIELD

The present invention relates to a steering device.

BACKGROUND ART

In a steering device, in succession to a primary collision in which a vehicle collides with another vehicle, a secondary collision in which the driver collides with a steering wheel occurs. In order to absorb shock in the secondary collision, various structures in which a part of a steering column releases from the vehicle body, and is moved in the direction of the column shaft have been proposed.

In FIG. 9 of Patent Reference 1, for example, a pair of engaging cutouts which extend parallel to the direction of a column shaft are disposed in a vehicle body-side bracket fixed to the vehicle body. A column-side bracket is supported through a pair of engaging capsules which are held by a plurality of engaging pins, by the engaging cutouts respectively. The engaging capsules are coupled and fixed to the column-side bracket through bolts which are passed through the engaging cutouts, respectively.

In a secondary collision, the plurality of engaging pins holding the engaging capsules are broken, whereby the engaging capsules are caused to release from the corresponding engaging cutouts, and the bolts, the engaging capsules, and the column bracket are caused to co-move with one another in the column shaft direction.

PRIOR ART REFERENCE

Patent Reference

Patent Reference 1: JP-A-2012-121538

SUMMARY OF THE INVENTION

Problem that the Invention is to Solve

When the engaging pins have play in the axial direction in housing spaces for the engaging pins, the attitudes of the engaging pins are not stabilized is a secondary collision, and there is a possibility that, for example, the engaging pins tumble (so-called falling down) in the movement direction of the column. In this case, the engaging pins cannot be smoothly sheared, and therefore there is a possibility that a stable shock absorption load cannot be obtained.

The inventors of the present application firstly considered that a slide plate which closes the upper side of a resin pin, and which, in a secondary collision, is moved in the movement direction of the column is disposed, and an elastic repulsion force is applied to the slide plate by an axial elastic projection disposed on the resin pin. When the upper side of the resin pin is covered by the slide plate, however, it is impossible to check during production whether the resin pin is attached or not. Therefore, it was considered that a resin-pin visual check hole for visually checking a resin pin is disposed in a slide plate. However, it was noted that, in the case where the resin-pin visual check hole passes over the axial elastic projection in a secondary collision, the axial projection is caught in the resin-pin visual check hole, and it is anticipated to cause a new problem in that the releasing load is affected (increased).

Therefore, it is an object of the invention to provide a steering device in which it is possible to, in a secondary collision, suppress an axial elastic projection of a resin pin from being caught in a resin-pin visual check hole.

Means for Solving the Problem

In order to attain the object, the invention provides a steering device comprising: a stationary bracket which is fixed to a vehicle body-side member, and which includes a first plate in which a first resin-pin passing hole, and a first bolt passing hole configured by a long hole that extends in a column movement direction in a secondary collision are formed; a movable jacket which is configured to rotatably support a steering shaft in which a steering member is coupled to one end; a movable bracket which is configured to support the movable jacket in a manner that, in a secondary collision, the movable bracket is moved together with the movable jacket in the column movement direction, and which includes a second plate that is opposed to a lower surface of the first plate, the second plate in which a second resin-pin passing hole and a second bolt passing hole are formed; a suspension mechanism which includes: a slide plate in which a third bolt passing hole and a resin-pin visual check hole are formed along an upper surface of the first plate; and a suspension bolt which is passed sequentially through the third bolt passing hole, the first bolt passing hole, and the second bolt passing hole to couple the first plate and the second plate together, thereby suspending the movable jacket through the movable bracket, the suspension mechanism which is movable in a corresponding column movement direction in a secondary collision; a resin pin which has an axial end surface opposed to the resin-pin visual check hole, which is passed through the first resin-pin passing hole and the second resin-pin passing hole to couple the second plate to a predetermined position of the first plate, and which, in a secondary collision, is configured to cause the second plate to release from the predetermined position in the column movement direction; and a collar which is fitted to the resin pin in a state where the collar is received directly or indirectly by a member that is suspended by the suspension mechanism, and which is higher in hardness than the resin pin, wherein, in one of the resin pin and the collar, an elastic projection which is configured to directly or indirectly urge the slide plate, and which projects in an axial direction is disposed at a position avoiding a range where, in a secondary collision, the resin-pin visual check hole is passed in the column movement direction.

According to the configuration, in one of the resin pin and the collar, the axial elastic projection which directly or indirectly urges the slide plate is disposed at a position avoiding the range where, in a secondary collision, the resin-pin visual check hole passes in the column movement direction. Therefore, it is possible to, in a secondary collision, suppress the axial elastic projection of the resin pin from being caught in the resin-pin visual check hole. Consequently, an influence due to catching on the releasing load (increase of the releasing load) can be suppressed.

An inner circumference of the first resin-pin passing hole, and an outer circumference of the collar may be formed into a laterally long shape which extends in a direction that is perpendicular to the column movement direction, thereby causing rotation of the collar to be restricted by the first resin-pin passing hole, the resin pin may include: a shaft portion which is passed through the collar; and a head flange which is coupled to one end of the shaft portion, the head flange may have: a first surface which is opposed to the slide plate; and a second surface which is opposed to an end surface of the collar, the elastic projection may be placed at a position avoiding the resin-pin visual check hole in the first surface of the head flange, and a rotation restricting convex portion which is disposed in at least one of the second surface of the head flange and the end surface of the collar may be fitted to a rotation restricting concave portion which is disposed on the other surface, thereby restricting relative rotation of the resin pin and the collar.

According to the configuration, rotation of the collar is restricted by the first resin-pin passing hole, and that of the resin pin is restricted by the collar. Therefore, it is possible to surely prevent the axial elastic projection of the resin pin from being caught in the resin-pin visual check hole in a secondary collision.

The resin pin may include: a shaft portion which is passed through the collar; and a head flange which is coupled to one end of the shaft portion, an inner circumference of the first resin-pin passing hole may include a flat portion which is engaged with a flat portion disposed on an outer circumference of the head flange, thereby restricting rotation of the resin pin, the head flange may have: a first surface which is opposed to the slide plate; and a second surface which is opposed to an end surface of the collar, and the elastic projection may be placed at a position avoiding the resin-pin visual check hole in the first surface of the head flange.

According to the configuration, rotation of the resin pin is restricted directly by the first resin-pin passing hole. While simplifying the structure, therefore, it is possible to surely prevent the axial elastic projection of the resin pin from being caught in the resin-pin visual check hole in a secondary collision.

The resin pin may include: a shaft portion which is passed through the collar; and a head flange which is coupled to one end of the shaft portion, the head flange may have: a first surface which is opposed to the slide plate; and a second surface which is opposed to an end surface of the collar, and the elastic projection may be disposed on the second surface of the head flange.

According to the configuration, the head flange of the resin pin has the first surface which is opposed to the slide plate, and the second surface which is opposed to the collar, and the axial elastic projection is not disposed on the first surface, but disposed on the second surface. The catch of the axial elastic projection in the resin-pin visual check hole can never happen.

The collar may include: a first collar which is placed in the first resin-pin passing hole, and which is press-fitted to the resin pin; and a second collar which is placed in the second resin-pin passing hole, and which is loose-fitted to the resin pin, and the elastic projection may be disposed on at least one of opposing surfaces the first collar and the second collar.

According to the configuration, the axial elastic projection is disposed on at least one of the opposing surfaces the first collar and the second collar. Therefore, the catch of the elastic projection in the resin-pin visual check hole can never happen.

The resin-pin visual check hole may include a collar visual check region through which a part of the collar can be visually checked.

According to the configuration, it is possible to check not only whether the resin pin is attached or not, but also whether the collar is attached or not, through the resin-pin visual check hole.

MODE FOR CARRYING OUT THE INVENTION

Preferred embodiments of the invention will be described with reference to the accompanying drawings.

First Embodiment

Figure 1:
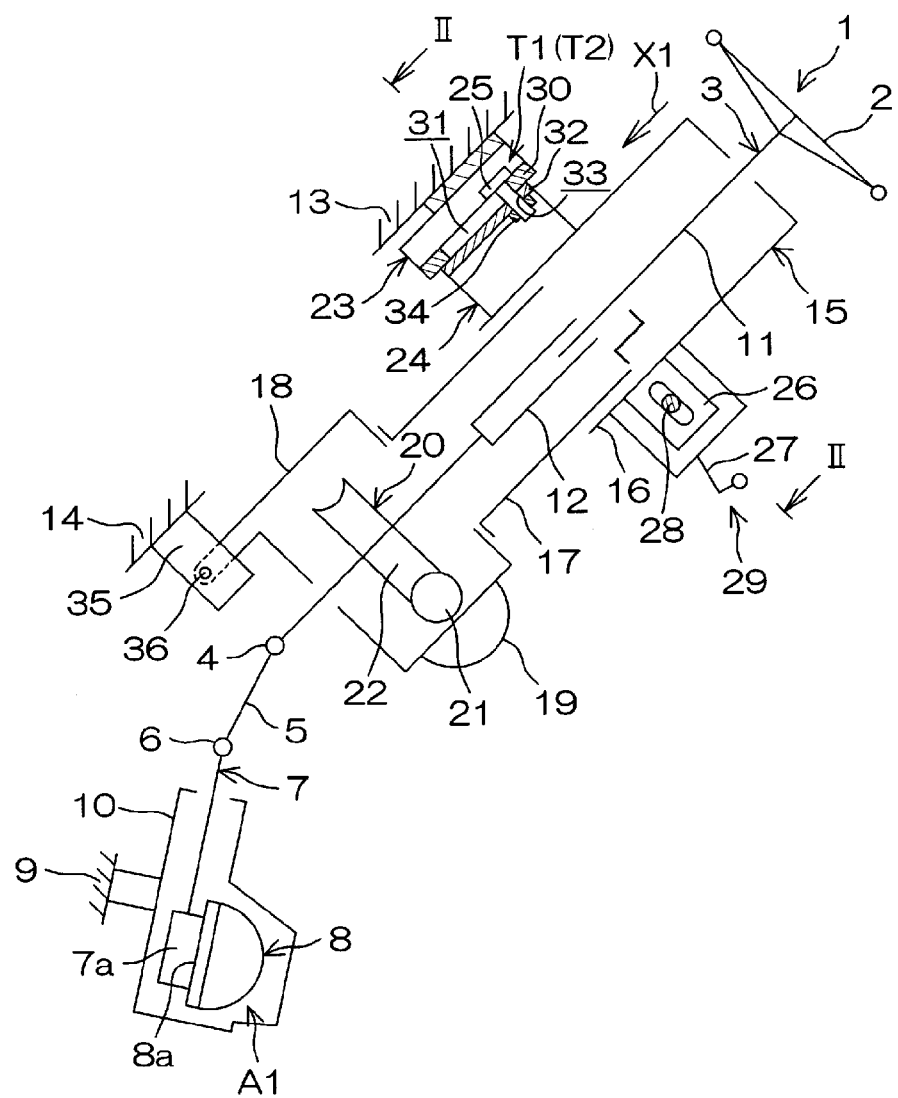
FIG. 1 is a diagrammatic side view of a steering device of a first embodiment of the invention, and schematically shows the configuration of the steering device.

FIG. 1 is a diagrammatic view schematically showing the configuration of a steering device of a first embodiment of the invention. Referring to FIG. 1, the steering device 1 includes: a steering shaft 3 which is coupled to a steering member 2 such as a steering wheel; an intermediate shaft 5 which is coupled to the steering shaft 3 through a universal joint 4; a pinion shaft 7 which is coupled to the intermediate shaft 5 through a universal joint 6; and a rack shaft 8 functioning as a steering shaft having a rack 8a which meshes with a pinion 7a disposed in the vicinity of an end portion of the pinion shaft 7.

A steering mechanism A1 is configured by a rack and pinion mechanism including the pinion shaft 7 and the rack shaft 8. The rack shaft 8 is supported by a housing 10 fixed to a vehicle body-side member 9, so as to be movable in the axial direction (direction perpendicular to the sheet) extending along the lateral direction of a vehicle. End portions of the rack shaft 8 are not illustrated, but are connected to respective steered wheels through a corresponding tie rod and a corresponding knuckle arm.

The steering shaft 3 has an upper shaft 11 and lower shaft 12 which are connected to each other by using, for example, a spline coupling so as to be co-rotatable and axially relatively movable. The steering shaft 3 is rotatably supported by a steering column 15 fixed to vehicle body-side members 13, 14, through a bearing which is not shown.

The steering column 15 includes a tubular upper jacket 16 (movable jacket), and tubular lower jacket 17 which are fitted to each other so as to be axially relatively movable, and a housing 18 which is connected to the axial lower end of the lower jacket 17. A reduction mechanism 20 which reduces the power of an electric motor 19 for assisting the steering, and which transmits the reduced power to the lower shaft 12 is housed in the housing 18. The reduction mechanism 20 has a driving gear 21 which is co-rotatably coupled to a rotation shaft (not shown) of the electric motor 19, and a driven gear 22 which meshes with the driving gear 21 to co-rotate with the lower shaft 12.

Although the embodiment will be described with reference to an example in which the steering device 1 is applied to an electric power steering device, the invention may be applied also to a manual steering device. Although the embodiment will be described with reference to an example in which the steering device 1 is tilt-adjustable, the invention may be applied also to a steering device which is not provided with a tilt adjusting function, or that which is tilt-adjustable and telescopically adjustable.

Figure 2:
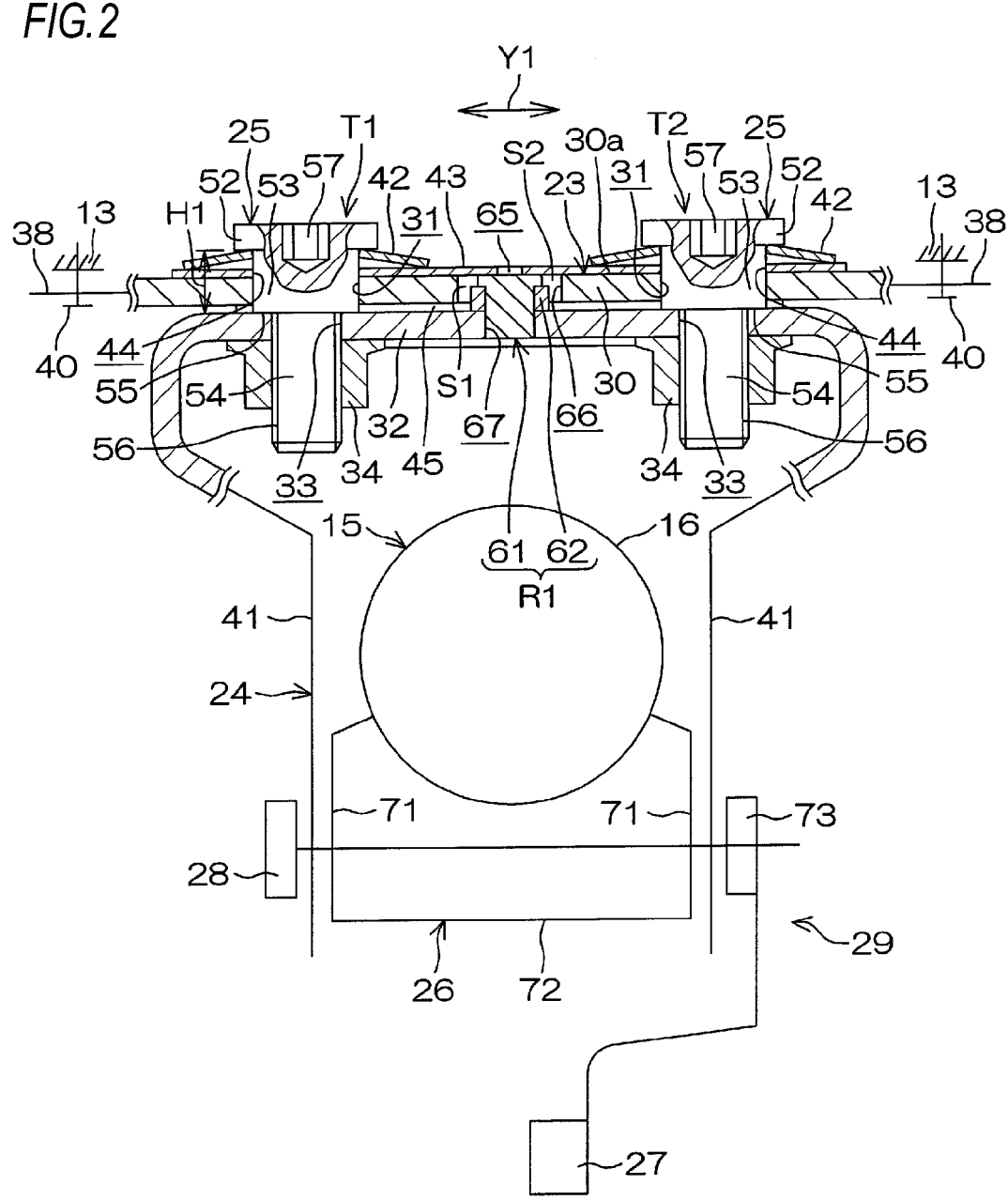
FIG. 2 is a schematic sectional view of the steering device of the first embodiment, and shows a section taken along line II-II in FIG. 1.

As shown in FIG. 2 which is a schematic sectional view, the steering device 1 includes the pair of suspension mechanisms T1, T2 in which the upper jacket 16 is suspended by the stationary bracket 23 through the tilt bracket 24 functioning as the movable bracket. As shown in FIGS. 1 and 2, namely, the tilt bracket 24 functioning as the movable bracket is suspended from the stationary bracket 23 fixed to the vehicle body-side member 13, through suspension bolts 25 functioning as the suspension shafts of the pair of suspension mechanisms T1, T2. By contrast, a column bracket 26 is fixed to the upper jacket 16 of the steering column 15.

As shown in FIGS. 1 and 2, the steering device 1 includes the locking mechanism 29 which, in accordance with an operation performed on an operation lever 27, the position of the column bracket 26 which has undergone the tilt adjustment (therefore, the positions of the upper jacket 16 and the steering member 2) is locked or unlocked through the tilt bracket 24 by using a fastening shaft 28.

Figure 3:
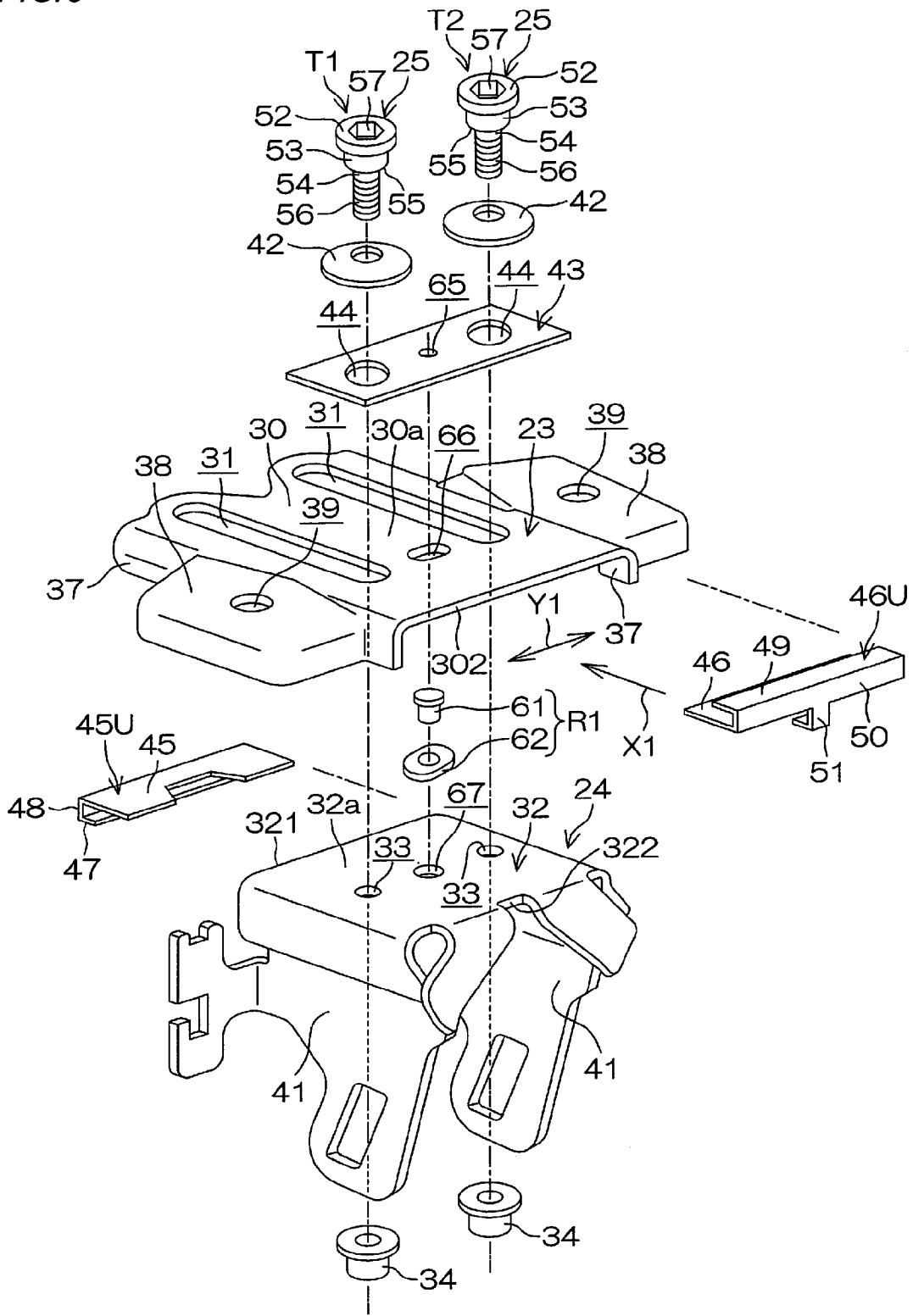
FIG. 3 is an exploded perspective view of the steering device of the first embodiment.

As shown in FIGS. 2 and 3, the tilt bracket 24 includes a pair of side plates 41. As shown in FIG. 2, the column bracket 26 has a groove-like shape including a pair of side plates 71 which are opposed to the pair of side plates 41 of the tilt bracket 24, respectively, and a coupling plate 72 through which the lower ends of the pair of side plates 71 are coupled to each other.

Referring to FIG. 2, the fastening shaft 28 is configured by a bolt which is passed through the side plates 41, 71 of the tilt bracket 24 and the column bracket 26. When a nut 73 screwed with the fastening shaft 28 is rotated by an operation of rotating the operation lever 27, the side plates 41, 71 are fastened together between the head of the bolt functioning as the fastening shaft 28 and the nut 73, thereby locking the side plates 41, 71. Therefore, the position of the steering member 2 after the tilt adjustment is locked, and the tilt locking is accomplished.

Figure 9:
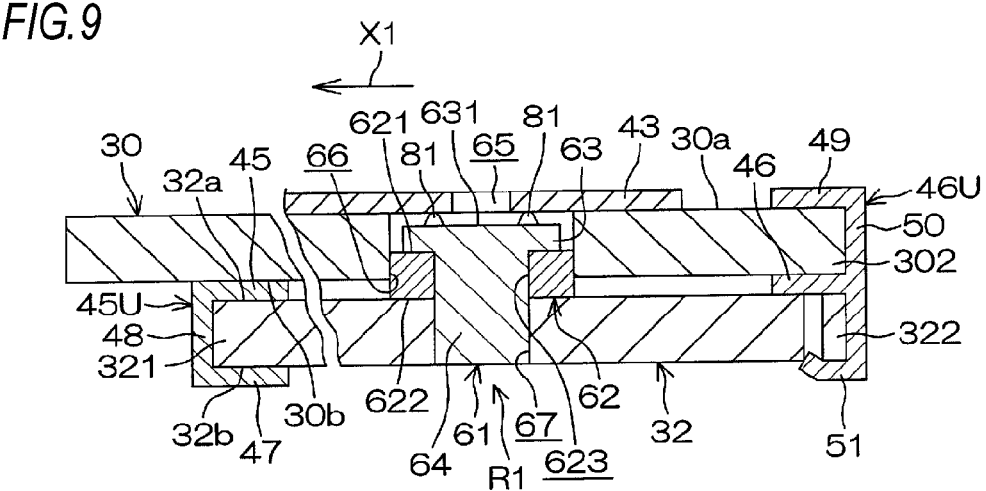
FIG. 9 is a sectional view of the coupled state of the first and second plates in the first embodiment, and shows a section in the anteroposterior direction (column movement direction) including the axis of the resin pin.
Figure 10:
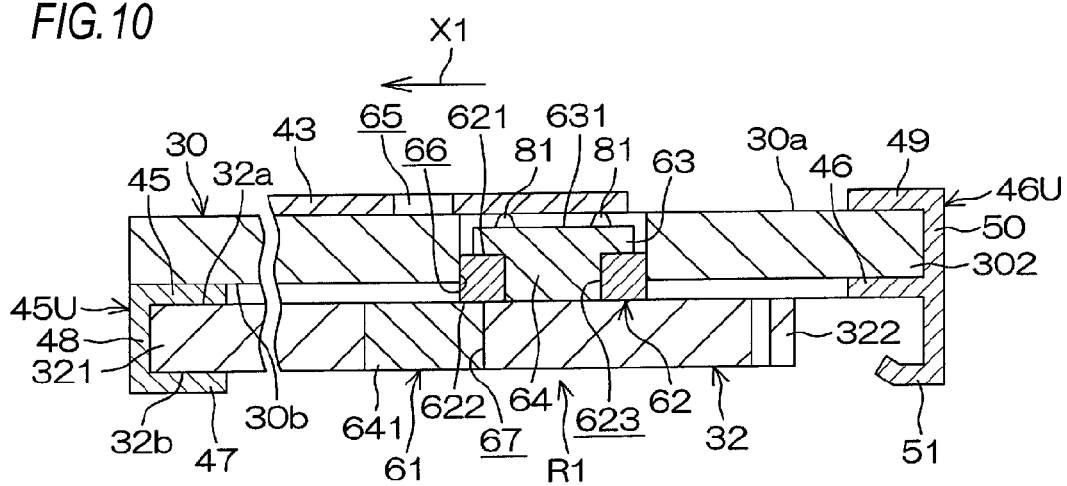
FIG. 10 is a sectional view of the first and second plates in the first embodiment in a secondary collision, and shows a state where the second plate is caused to release from a predetermined position of the first plate in the column movement direction by sharing of the resin pin.

The steering device 1 includes a coupling/decoupling mechanism R1 through which a first plate 30 of the stationary bracket 23 and a second plate 32 of the tilt bracket 24 are coupled to each other, and which, in a second collision, causes the second plate 32 to release from a predetermined position (position shown in FIG. 9) of the first plate 30 in a column movement direction X1 as shown in FIG. 10.

Figure 4:
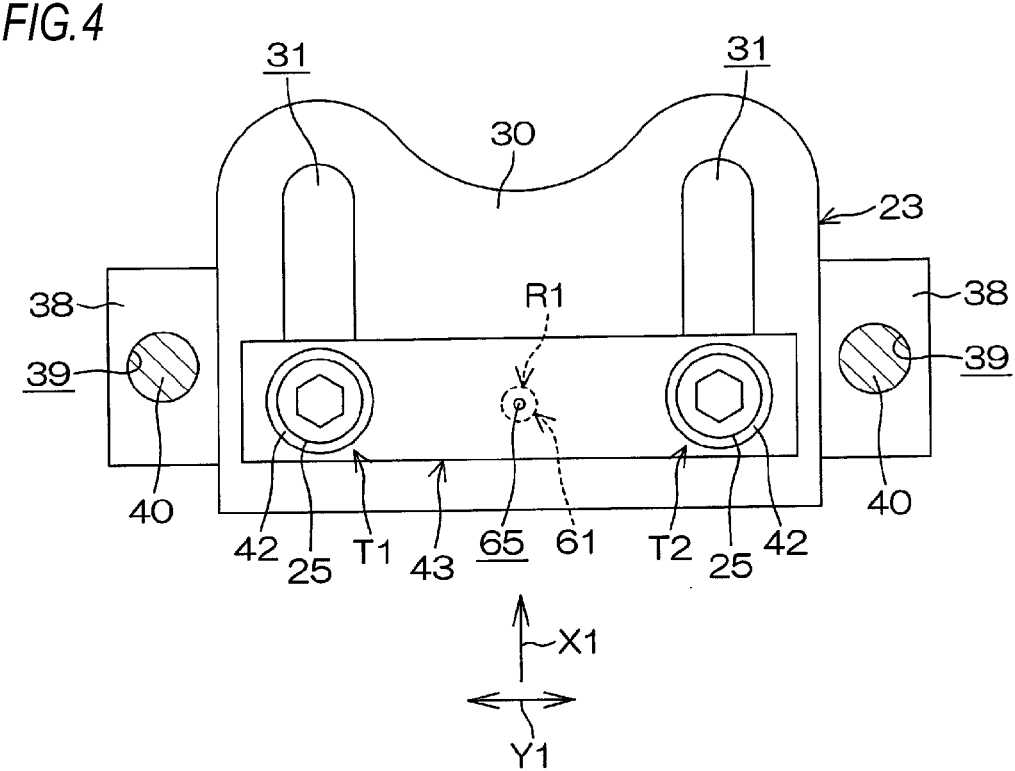
FIG. 4 is a partially cutaway schematic plan view of a stationary bracket, pair of suspension mechanisms, and coupling/decoupling mechanism in the first embodiment.
Figure 5:
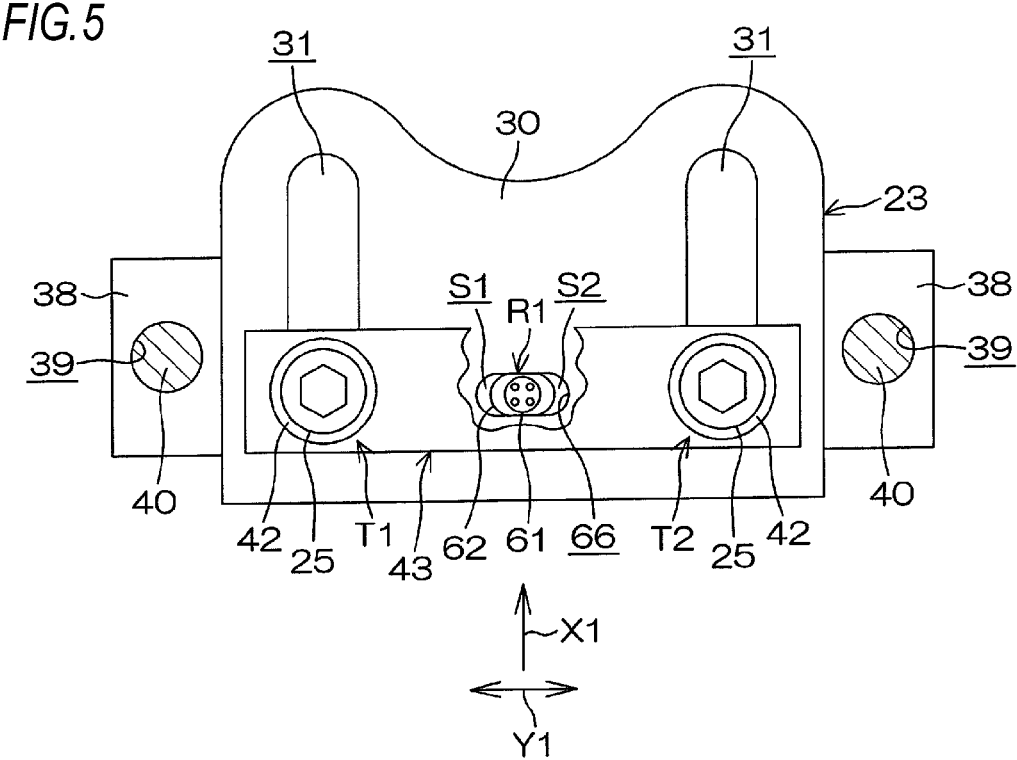
FIG. 5 is a partially cutaway schematic plan view of the stationary bracket, pair of suspension mechanisms, and coupling/decoupling mechanism, and showing a partial cutaway of a slide plate in FIG. 4.

As shown in FIG. 2 and FIGS. 4 and 5 which are partially cutaway schematic plan views, the coupling/decoupling mechanism R1 is placed between the pair of suspension mechanisms T1, T2 (i.e., between a pair of first bolt passing holes 31 which will be described later, and which are in the first plate 30 of the stationary bracket 23) with respect to a direction Y1 that is perpendicular to the column movement direction X1. Specifically, the coupling/decoupling mechanism R1 is placed in the middle position between the pair of first bolt passing holes 31 (i.e., between the pair of suspension bolts 25) with respect to the direction Y1 that is perpendicular to the column movement direction X1.

Referring to FIG. 1, the stationary bracket 23 includes the first plate 30 which is parallel to the column movement direction X1 (corresponding to the axial direction of the steering shaft 3) in a secondary collision. In the first plate 30, the first bolt passing holes 31 for the suspension mechanisms T1, T2 and configured by long holes extending parallel to the column movement direction X1 are formed. By contrast, the tilt bracket 24 (movable bracket) includes the second plate 32 which is opposed to the first plate 30. In the second plate 32, second bolt passing holes 33 opposed to parts of the first bolt passing holes 31, and for the suspension mechanisms T1, T2 are formed.

The suspension bolts 25 are configured by bolts which are passed through the first bolt passing holes 31 of the first plate 30, and the second bolt passing holes 33 of the second plate 32, and which are screwed with nuts 34. The suspension bolts 25 which cooperate with the nuts 34 to couple the first plate 30 and the second plate 32 with each other suspend the upper jacket 16 (movable jacket) through the tilt bracket 24 (movable bracket) and the column bracket 26. In a secondary collision, the suspension bolts 25 are movable in the column movement direction X1 along the first bolt passing holes 31 together with the tilt bracket 24 (movable bracket), the column bracket 26, and the upper jacket 16.

A lower bracket 35 which is fixed to the vehicle body-side member 14 supports a tilt center shaft 36 functioning as a pivot shaft. The tilt center shaft 36 supports the lower jacket 17 through the housing 18 of the steering column 15, so as to be swingable about the tilt center shaft 36.

As shown in FIGS. 2 and 3, each of the suspension mechanisms T1, T2 is configured by the suspension bolt 25, a plate spring 42 formed by, for example, a disc spring, the nut 34, and the like. The coupling/decoupling mechanism R1 is configured by a resin pin 61 which is to be sheared in a secondary collision, and a collar 62 which is fitted to a part in the axial direction of the resin pin 61, and in which the outer circumference is formed into a laterally elongated shape such as an oblong circular shape. As the material of the collar 62, a metal such as iron may be used, or a resin, ceramic, or the like which is higher in hardness than the resin pin 61 may be used. For example, the resin pin 61 may be formed by polyacetal resin (POM), and the collar 62 may be formed by polyamide resin (PA) which is higher in hardness than polyacetal resin.

Referring to FIG. 3, the stationary bracket 23 includes a pair of side plates 37 which are downward extended from a pair of side edges of the first plate 30, and a pair of attachment plates 38 which are extended outwardly and laterally from the pair of side plates 37, respectively. The stationary bracket 23 is formed by, for example, sheet metal work. The attachment plates 38 are fixed to the vehicle body-side member 13 by fixing bolts 40 (see FIG. 4) which are passed through screw passing holes 39 (see FIGS. 3 and 4) disposed in the attachment plates 38, respectively. As shown in FIG. 1, therefore, the stationary bracket 23 is fixed to the vehicle body-side member 13.

In the first plate 30 of the stationary bracket 23, referring to FIGS. 2 to 4, the first bolt passing holes 31 are pairingly formed correspondingly with the pair of suspension bolts 25. The pair of first bolt passing holes 31 extend parallel to the column movement direction X1 in a secondary collision, and are separated from each other in the direction Y1 that is perpendicular to the column movement direction X1.

As shown in FIGS. 2 and 3, the tilt bracket 24 (movable bracket) is formed by, for example, sheet metal work. The tilt bracket 24 includes the second plate 32, and a pair of side plates 41 which are downward extended from a pair of side edges of the second plate 32, and is formed into a groove-like shape. As shown in FIGS. 2 and 3, portions where the second plate 32 is coupled to the side plates 41 may be formed into an arcuate shape.

In the second plate 32 of the tilt bracket 24, the second bolt passing holes 33 are pairingly disposed correspondingly with the pair of suspension bolts 25. Each of the suspension bolts 25 is sequentially passed through the annular plate spring 42 formed by, for example, a disc spring, a corresponding third bolt passing hole 44 of a slide plate 43, the corresponding first bolt passing hole 31 of the first plate 30, and the corresponding second bolt passing hole 33 of the second plate 32, and then screwed with the nut 34. According to the configuration, the suspension bolts 25 suspend the tilt bracket 24.

As shown in FIGS. 3 and 4, the slide plate 43 is configured by a long plate which extends in the direction Y1 that is perpendicular to the column movement direction X1, and, as shown in FIG. 2, interposed between the plate springs 42 and the upper surface 30a of the first plate 30. In the slide plate 43, at least the surface on the side of the first plate 30 is configured by a low-friction material such as a fluorine resin. Namely, the whole of the slide plate 43 may be configured by a low-friction material, or the surface of the slide plate 43 on the side of the first plate 30 may be covered with a low-friction material.

As shown in FIGS. 3 and 9, a first interposed plate 45 and second interposed plate 46 which, in a secondary collision, reduce the sliding resistance in the movement of the second plate 32 in the column movement direction X1 with respect to the first plate 30 are interposed between the first plate 30 and the second plate 32.

The first interposed plate 45 constitutes a groove-like unit 45U which is engaged with a first end portion 321 that is an end portion in the column movement direction X1 of the second plate 32. Namely, the unit 45U includes: the first interposed plate 45 which extends along the upper surface 32a of the second plate 32 and the lower surface 30b of the first plate 30; an opposing plate 47 which is opposed to the first interposed plate 45, and which extends along the lower surface 32b of the second plate 32; and a coupling plate 48 which couples the first interposed plate 45 with the opposing plate 47, and which butts against the edge in the column movement direction X1 of the second plate 32.

In the first interposed plate 45, at least the surface on the side of the first plate 30 is configured by a low-friction material such as a fluorine resin. Namely, the first interposed plate 45 or the unit 45U may be configured by a low-friction material, or the surface of the first interposed plate 45 on the side of the first plate 30 may be covered with a low-friction material. The second interposed plate 46 constitutes a unit 46U which is engaged with a second end portion 302 that is an end portion of the first plate 30 opposite to the column movement direction X1, and a second end portion 322 that is an end portion of the second plate 32 opposite to the column movement direction X1. Namely, the unit 46U includes the second interposed plate 46 which extends along the upper surface 32a of the second plate 32 and the lower surface 30b of the first plate 30, and an opposing plate 49 which is opposed to the second interposed plate 46, and which extends along the upper surface 30a of the first plate 30. The unit 46U further includes a coupling plate 50 which couples the second interposed plate 46 with the opposing plate 49, and which butts against the edge of the first plate 30 opposed to the column movement direction X1, and an engaging portion 51 which is to be hookingly engaged with the second end portion 322 of the second plate 32, and which has, for example, a hook-like shape.

In the second interposed plate 46, at least the surface on the side of the second plate 32 is formed by a low-friction material such as a fluorine resin. Namely, the second interposed plate 46 or the unit 46U may be formed by a low-friction material, or the surface of the second interposed plate 46 on the side of the second plate 32 may be covered with a low-friction material.

As shown in FIGS. 2 and 3, each of the suspension bolts 25 includes: a head portion 52; a large-diameter portion 53 which is continuous to the head portion 52, and which is smaller in diameter than the head portion 52; a small-diameter portion 54 which is continuous to the large-diameter portion 53, and which is smaller in diameter than the large-diameter portion 53; a step portion 55 which is formed between the large-diameter portion 53 and the small-diameter portion 54; and a threaded portion 56 which is disposed in the small-diameter portion 54. A tool engagement part 57 which has, for example, a hexagonal hole shape is disposed in the head portion 52.

As shown in FIG. 2, the large-diameter portion 53 is passed through the annular plate spring 42, the third bolt passing hole 44 of the slide plate 43, and the first bolt passing hole 31 of the first plate 30. The step portion 55 butts against the upper surface 32a of the second plate 32 to be received by the upper surface 32a. The second plate 32 is pressingly held between the step portion 55 and the nut 34, and the suspension bolts 25 and the second plate 32 are fixed.

The distance H1 (corresponding to the shaft length of the large-diameter portion 53) between the head portion 52 and the step portion 55 is made larger than the total of the thickness of the first interposed plate 45 (or that of the second interposed plate 46) which is interposed between the first plate 30 and the second plate 32, that of the first plate 30, that of the slide plate 43 which extends along the upper surface 30a of the first plate 30, and that of the plate springs 42 in the most compressed state. Therefore, the plate springs 42 elastically urges the first plate 30 toward the second plate 32 through the slide plate 43.

As shown in FIG. 4, the resin pin 61 of the first plate 30, and for the coupling/decoupling mechanism R1 is placed in the middle position between the first bolt passing holes 31 for the suspension mechanisms T1, T2 with respect to the direction Y1 that is perpendicular to the column movement direction X1. That is, the resin pin 61 is placed in the middle position between the pair of suspension bolts 25 with respect to the direction Y1 that is perpendicular to the column movement direction X1.

As shown in FIG. 5 which is is a partially cutaway view of the slide plate 43 of FIG. 4, the first resin-pin passing hole 66 of the first plate 30, and for the coupling/decoupling mechanism R1 is formed into a laterally long hole which extends in the direction Y1 that is perpendicular to the column movement direction X1. Therefore, gaps S1, S2 are disposed between the outer circumference of the collar 62 and the inner circumference of the first resin-pin passing hole 66 with respect to the direction Y1 that is perpendicular to the column movement direction X1.

Figure 7:
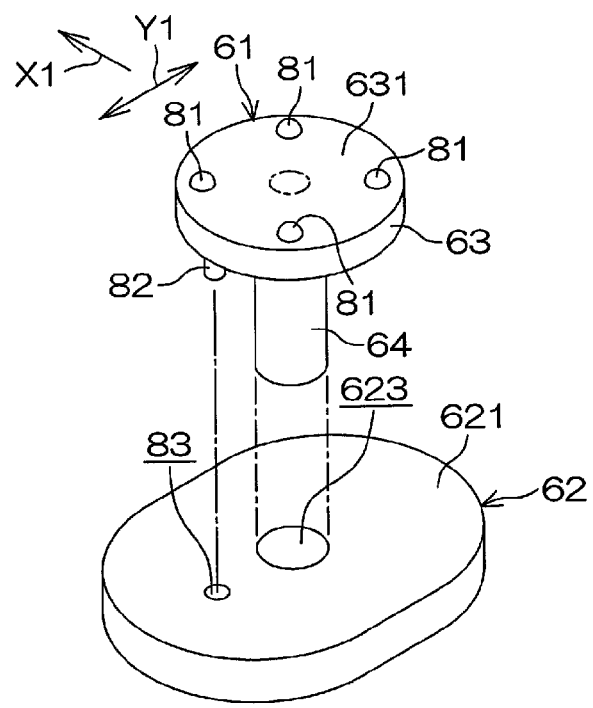
FIG. 7 is an exploded perspective view of a resin pin and collar in the coupling/decoupling mechanism in the first embodiment.
Figure 8:
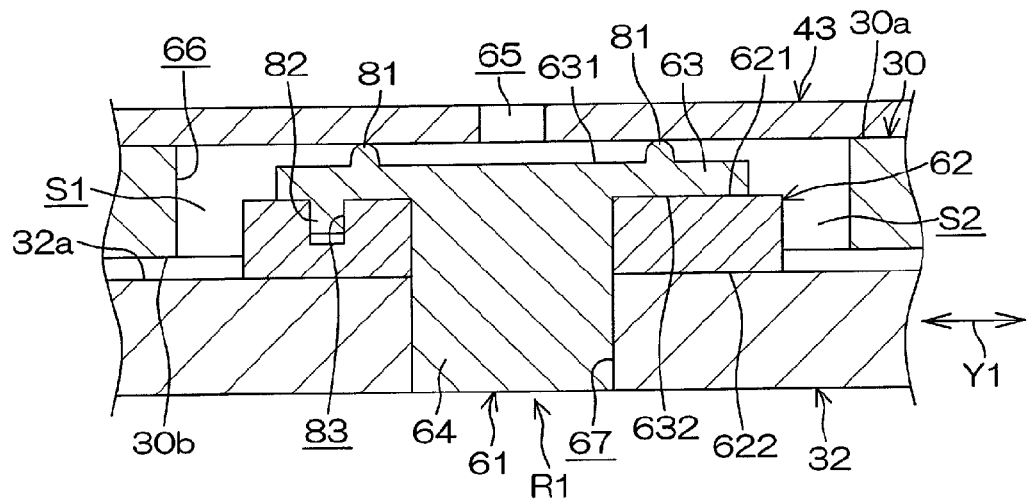
FIG. 8 is a sectional view of a coupled state of first and second plates in the first embodiment, and shows a section in the lateral direction (direction perpendicular to a column movement direction) including the axis of the resin pin.

Referring to FIG. 2, FIG. 7 which is an exploded perspective view of the coupling/decoupling mechanism R1, and FIG. 8 which is a sectional view of the coupling/decoupling mechanism R1 taken along the direction Y1 that is perpendicular to the column movement direction X1, the resin pin 61 of the coupling/decoupling mechanism R1 includes a head flange 63 which has, for example, a circular section, and a columnar shaft portion 64 which is smaller in diameter than the head flange 63.

As shown in FIG. 8, the slide plate 43 is placed so as to cover the upper side of the head flange 63 of the resin pin 61, thereby preventing the resin pin 61 from upwardly slipping off. In the slide plate 43, a resin-pin visual check hole 65 which is smaller than the outer diameter of the head flange 63 of the resin pin 61 is formed so as to be opposed to the head portion 63. After assembling the coupling/decoupling mechanism R1, when the head flange 63 of the resin pin 61 is viewed through the resin-pin visual check hole 65 of the slide plate 43, it is possible to easily determine whether a working failure such as a failure of attachment of the resin pin 61 occurs or not.

The head flange 63 of the resin pin 61 and most of the collar 62 are inserted into the first resin-pin passing hole 66 of the first plate 30 of the stationary bracket 23, and for the coupling/decoupling mechanism R1. A part of the collar 62 projects from the first resin-pin passing hole 66. In the shaft portion 64 of the resin pin 61, a part which projects from the collar 62 is passed through a second resin-pin passing hole 67 of the second plate 32 of the tilt bracket 24 (movable bracket), and for the coupling/decoupling mechanism R1.

Figure 6:
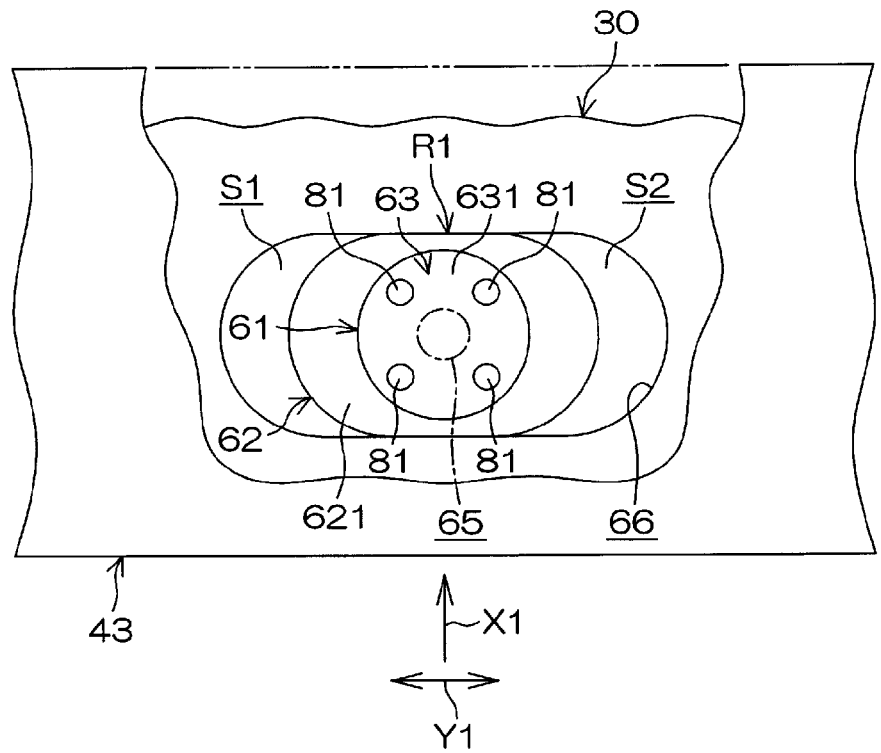
FIG. 6 is a partial enlarged view of FIG. 5.

The head flange 63 has a first surface 631 which is opposed to the slide plate 43, and a second surface 632 which is opposed to a first end surface 621 (upper end surface) of the collar 62. As shown in FIGS. 6 and 7, a plurality of elastic projections 81 that project in the axial direction of the resin pin 61 are placed at positions which, in an initial attached state, do not interfere with the resin-pin visual check hole 65 of the slide plate 43 in a plan view, and which avoid a range where, in a secondary collision, the resin-pin visual check hole 65 is passed in the column movement direction X1. Specifically, the plurality of elastic projections 81 are annularly arranged so that they are arranged at regular intervals on a circumference surrounding the resin-pin visual check hole 65 in a plan view, and the phase is at a position which avoids a range where, in a secondary collision, the resin-pin visual check hole 65 is passed in the column movement direction X1. As shown in FIG. 8, the plurality of elastic projections 81 are in contact with the lower surface of the slide plate 43 in a state where the projections are elastically compressed, and directly press and urge the slide plate 43 by means of an elastic repulsion force.

As shown in FIGS. 7 and 8, at least one rotation restricting convex portion 82 which projects toward the first end surface 621 of the collar 62 is disposed on the second surface 632 of the head flange 63. Moreover, a rotation restricting concave portion 83 which is to engage with the rotation restricting convex portion 82 is disposed on the first end surface 621 of the collar 62. When the rotation restricting convex portion 82 engages with the rotation restricting concave portion 83, relative rotation (rotation about the center axis of the resin pin 61) of the resin pin 61 and the collar 62 is restricted.

As shown in FIG. 6, by contrast, the outer circumference of the collar 62 is formed into a laterally elongated shape such as an oblong circular shape which extends in the direction Y1 that is perpendicular to the column movement direction X1, and fitted to the first resin-pin passing hole 66 which is in the first plate 30, and which is a laterally long hole which extends in the direction Y1 that is perpendicular to the column movement direction X1. Therefore, rotation of the collar 62 is restricted by the first resin-pin passing hole 66. Namely, the first resin-pin passing hole 66 restricts rotation of the resin pin 61 about the center axis of the resin pin 61 through the collar 62.

As shown in FIGS. 6, 7, and 8, the shaft portion 64 of the resin pin 61 is inserted into a center hole 623 of the collar 62. As shown in FIG. 6, the outer diameter of the collar 62 is made larger than that of the head flange 63 of the resin pin 61. As shown in FIG. 8, the first axial end surface 621 of the collar 62 butts against the head flange 63 of the resin pin 61, and a second axial end surface 622 of the collar 62 is received by the upper surface 32a of the second plate 32 which is the member suspended by the suspension mechanisms T1, T2, whereby the resin pin 61 and the metal collar 62 are prevented from slipping off to the lower side of the second plate 32.

In a secondary collision, as shown in FIGS. 9 to 10, the shaft portion 64 of the resin pin 61 is sheared by displacement between the matching surfaces of the second end surface 622 of the collar 62 and the second plate 32 due to the movement of the second plate 32 with respect to the first plate 30. Namely, a part 641 of the shaft portion 64 separates from the remaining part. A shearing edge configured by the inner peripheral edge of the second end surface 622 of the collar 62 has an arcuate shape, and also a shearing edge configured by the edge portion of the second resin-pin passing hole 67 of the second plate 32 has an arcuate shape.

According to the first embodiment, in the resin pin 61, the axial elastic projections 81 which applies the elastic repulsion force (pressing and urging force) to the slide plate 43 are disposed at the positions which, in the initial attached state, do not interfere with the resin-pin visual check hole 65, and which avoid a range where, in a secondary collision, the resin-pin visual check hole 65 is passed in the column movement direction X1. Therefore, it is possible to, in a secondary collision, suppress the axial elastic projections 81 of the resin pin 61 from being caught in the resin-pin visual check hole 65. Consequently, an influence due to catching in a secondary collision between the axial elastic projections 81 of the resin pin 61 and the resin-pin visual check hole 65, on the releasing load (increase of the releasing load) can be suppressed.

Specifically, the inner circumference of the first resin-pin passing hole 66, and outer circumference of the collar 62 which are fitted to each other are formed into a laterally long shape which extends in the direction that is perpendicular to the column movement direction X1, and therefore rotation of the collar 62 is restricted by the first resin-pin passing hole 66. Because of the engagement between the rotation restricting convex portion 82 and the rotation restricting concave portion 83, furthermore, rotation of the resin pin 61 is restricted by the collar 62. In a secondary collision, therefore, it is possible to surely prevent the resin pin 61 from rotating about the center axis to cause the elastic projection 81 to be caught in the resin-pin visual check hole 65. The attitude of the resin pin 61 in a secondary collision can be stabilized as far as possible.

Although not illustrated, the rotation restricting convex portion may be disposed on the first end surface 621 of the collar 62, and the rotation restricting concave portion may be disposed on the second surface 632 of the head flange 63.

Second Embodiment

Figure 11:
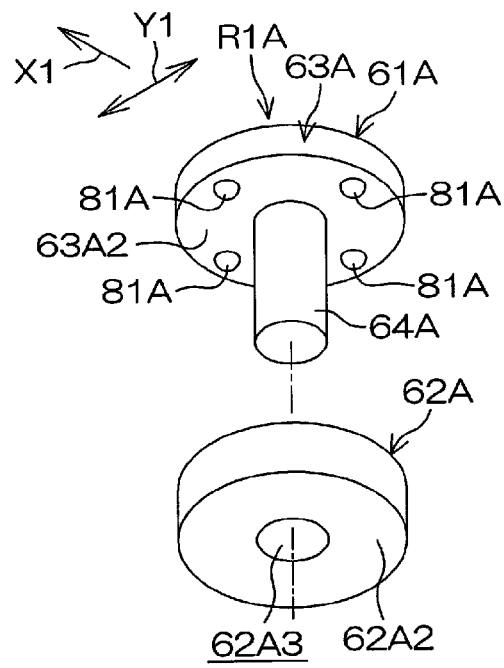
FIG. 11 is an exploded perspective view of a resin pin and collar in a coupling/decoupling mechanism in a second embodiment of the invention.
Figure 12:
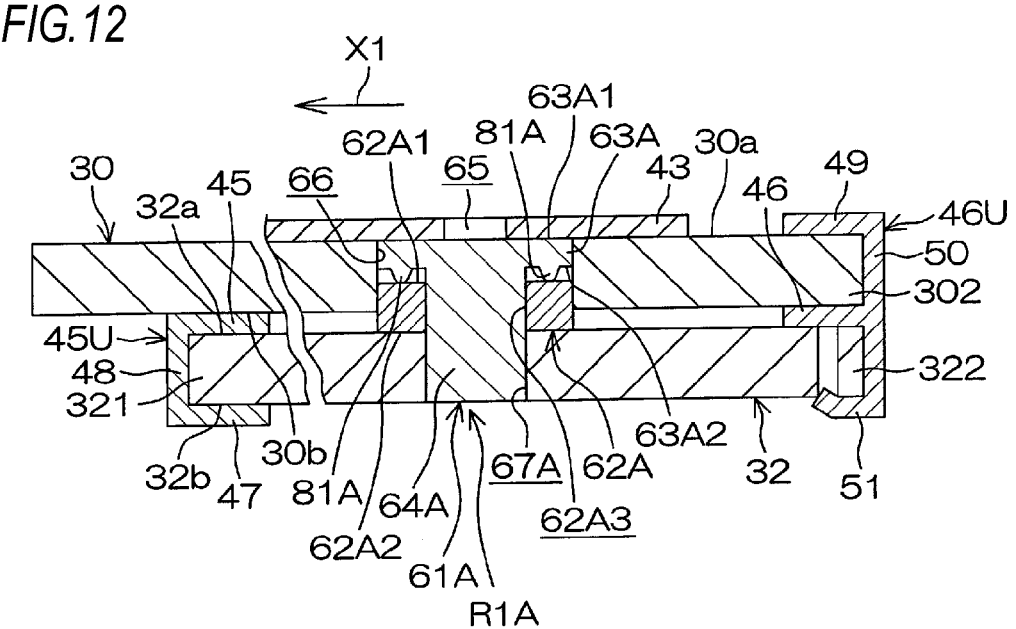
FIG. 12 is a sectional view of a coupled state of first and second plates in the second embodiment, and shows a section in the anteroposterior direction (column movement direction) including the axis of the resin pin.

Next, FIG. 11 is an exploded perspective view of a resin pin 61A and collar 62A in a coupling/decoupling mechanism R1A in a second embodiment of the invention. FIG. 12 is a sectional view of a coupled state of the first plate 30 and second plate 32 in the second embodiment, and shows a section in the anteroposterior direction (column movement direction X1) including the axis of the resin pin 61A.

Referring to FIGS. 11 and 12, the resin pin 61A includes a columnar shaft portion 64A which is passed through a center hole 623A of an annular collar 62A, and a head flange 63A which is coupled to one end of the shaft portion 64A. The head flange 63A has a first surface 63A1 which is opposed to the slide plate 43 as shown in FIG. 12, and an annular second surface 63A2 which is opposed to a first end surface 62A1 of the collar 62A.

A plurality of axial elastic projections 81A which are annularly arranged at regular intervals in the circumferential direction on a circumference surrounding the shaft portion 64A are formed on second surface 63A2 of the head flange 63A. The elastic projections 81A are contacted with the first end surface 62A1 of the collar 62A in a state where the projections are elastically compressed, and give an elastic repulsion force to the collar 62A. As a result, the first surface 63A1 of the head flange 63 of the resin pin 61 is urged toward the slide plate 43, and a second end surface 62A2 of the collar 62A is urged toward the upper surface 32a of the second plate 32.

The head flange 63A and most of the collar 62A are inserted into the first resin-pin passing hole 66 of the first plate 30. A part of the shaft portion 64A projects from the collar 62A, and is inserted into the second resin-pin passing hole 67 of the second plate 32.

The collar 62A is formed by a resin, ceramic, metal, or the like which is higher in hardness than the resin pin 61A. For example, the resin pin 61A may be formed by polyacetal resin (POM), and the collar 62A may be formed by polyamide resin (PA) which is higher in hardness than polyacetal resin.

In the components of the second embodiment of FIG. 12, the components which are identical with the components of the first embodiment of FIG. 9 are denoted by the same reference numerals as those for the components of the first embodiment of FIG. 9.

According to the second embodiment, the head flange 63A of the resin pin 61A has the first surface 63A1 which is opposed to the slide plate 43, and the second surface 63A2 which is opposed to the collar 62A, and the axial elastic projections 81A are disposed not on the first surface 63A1 but on the second surface 63A2. The elastic projections 81A are in contact with the first surface 62A1 of the collar 62A in which the second surface 62A2 is received by the second plate 32 (suspended member), in a state where the projections are elastically compressed. The elastic projections 81A indirectly apply the pressing and urging force (elastic repulsion force) to the slide plate 43 through the first surface 63A1 of the head flange 63A of the resin pin 61A.

The catch of the axial elastic projections 81A disposed on the second surface 63A2 which is not opposed to the slide plate 43, in the resin-pin visual check hole 65 can never happen. Therefore, an influence due to the above-described catch on the releasing load (increase of the releasing load) can be suppressed. In the second embodiment, although not illustrated, the axial elastic projections disposed on the first end surface 62A1 of the collar 62A may butt against the second surface 63A2 of the head flange 63A of the resin pin 61A.

Third Embodiment

Figure 13:
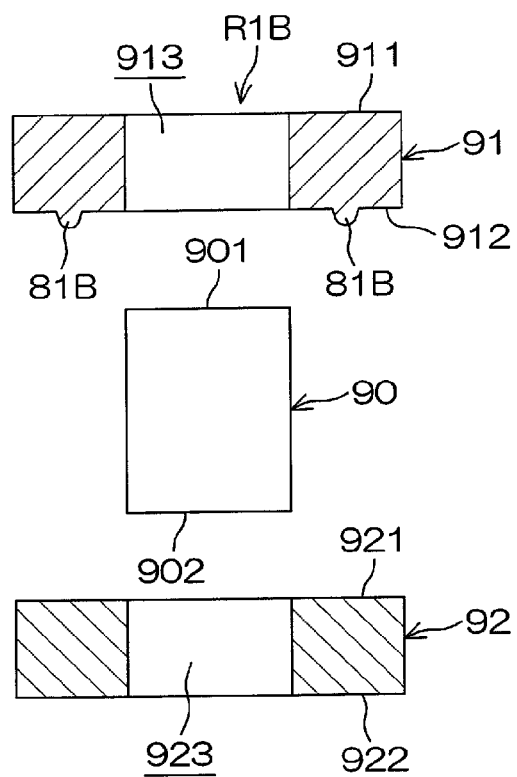
FIG. 13 is an exploded perspective view of a resin pin and collar in a coupling/decoupling mechanism in a third embodiment of the invention.
Figure 14:
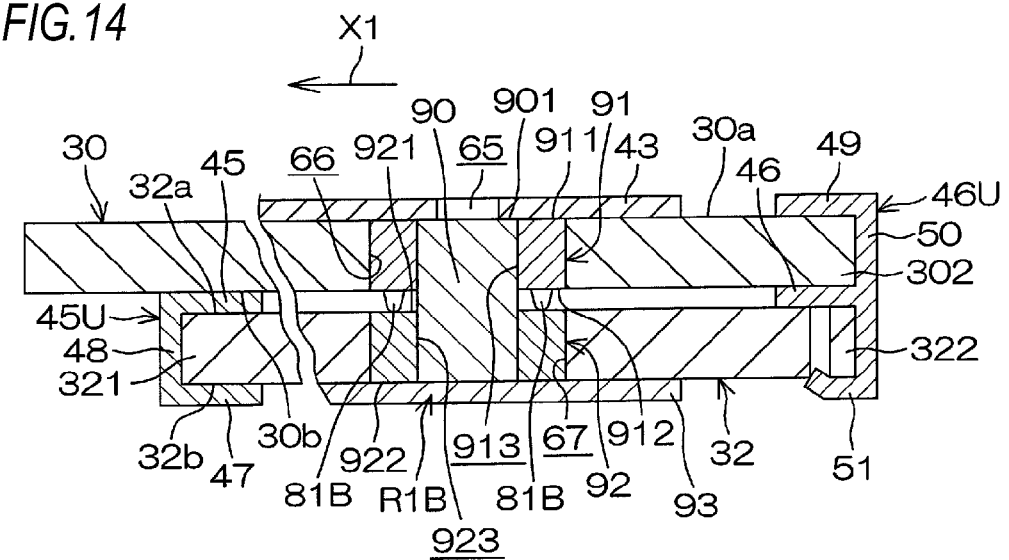
FIG. 14 is a sectional view of a coupled state of first and second plates in the third embodiment, and shows a section in the anteroposterior direction (column movement direction) including the axis of the resin pin.

Next, FIG. 13 is an exploded perspective view of a resin pin 90 and two-step collar (first collar 91 and second collar 92) in a coupling/decoupling mechanism R1B in a third embodiment of the invention. FIG. 14 is a sectional view of a coupled state of the first plate 30 and the second plate 32 in the third embodiment, and shows a section in the anteroposterior direction (column movement direction X1) including the axis of the resin pin 90.

As shown in FIG. 13, the resin pin 90 has a columnar shape. The first collar 91 on the side of the slide plate 43 is press-fitted to the resin pin 90, and the resin pin 90 and the first collar 91 are integrally movable in the axial direction. The second collar 92 on the side of the second plate 32 (suspended member) is loose-fitted to the resin pin 90, and the resin pin 90 and the second collar 92 are relatively movable in the axial direction.

The resin pin 90 has a first end surface 901 and second end surface 902 which are opposed to each other in the axial direction. The both ends of the resin pin 90 may be formed into a conically tapered shape in order to enable the resin pin 90 to be easily inserted into center holes 913, 923 of the collars 91, 92 (not shown).

Both the first collar 91 and the second collar 92 have an annular shape. The first collar 91 has a first end surface 911 and second end surface 912 which are opposed to each other in the axial direction. The second collar 92 has a first end surface 921 and second end surface 922 which are opposed to each other in the axial direction.

The collars 91, 92 are formed by a resin, ceramic, metal, or the like which is higher in hardness than the resin pin 90. For example, the resin pin 90 may be formed by polyacetal resin (POM), and the collars 91, 92 may be formed by polyamide resin (PA) which is higher in hardness than polyacetal resin.

As shown in FIG. 14, the first collar 91 is placed in the first resin-pin passing hole 66, and the second collar 92 is placed in the second resin-pin passing hole 67. The first end surface 911 in the axial direction of the first collar 91, and the first end surface 901 in the axial direction of the resin pin 90 are opposed to the slide plate 43. The first end surface 901 of the resin pin 90 may be flush with the first end surface 911 of the first collar 91, or project from the first end surface 911 of the first collar 91 toward the slide plate 43. The second end surface 912 in the axial direction of the first collar 91 is opposed to the first end surface 921 of the second collar 92. Axial elastic projections 81B disposed on the second end surface 912 of the first collar 91 butt against the second end surface 921 of the second collar 92.

A lower plate 93 is disposed along the lower surface 32b of the second plate 32. The lower plate 93 is co-fastened with the slide plate 43 by suspension bolts of suspension mechanisms (corresponding to the suspension mechanisms T1, T2 of FIG. 1) which are not shown in FIG. 14. The lower plate 93 functions as a slide plate which, in a secondary collision, slides in the column movement direction X1 together with the second plate 32 and the slide plate 43. Moreover, the lower plate 93 (corresponding to the member suspended by the suspension mechanisms T1, T2) receives the lower end surface of the resin pin 90 and the second end surface 922 of the second collar 92, and supports them so that the coupling/decoupling mechanism RIB does not drop.

In the components of the third embodiment of FIG. 14, the components which are identical with the components of the first embodiment of FIG. 9 are denoted by the same reference numerals as those for the components of the first embodiment of FIG. 9.

According to the third embodiment, the first collar 91 which is placed on the side of the slide plate 43, and which is press-fitted to the resin pin 90, and the second collar 92 which is placed on the side of the second plate (corresponding to the suspended member), and which is loose-fitted to the resin pin 90 are stacked in two stages in the axial direction of the resin pin 90, and the axial elastic projections 81B which urge the first end surface 921 of the second collar 92 are disposed on the second end surface 912 of the first collar 91.

According to the configuration, the second end surface 922 of the second collar 92 are pressed and urged against the lower plate 93. By contrast, the first end surface 911 of the first collar 91 and the first end surface 901 of the resin pin 90 are pressed and urged against the slide plate 43. In other words, the elastic projections 81B indirectly apply the pressing and urging force (elastic repulsion force) to the slide plate 43 through the first collar 91 and the first end surface 901 of the resin pin 90. Therefore, the attitude of the resin pin 90 which is passed through the collars 91, 92 is stabilized. Moreover, the catch of the axial elastic projections 81B in the resin-pin visual check hole 65 can never happen. Therefore, an influence due to the above-described catch on the releasing load (increase of the releasing load) can be suppressed.

In the third embodiment of FIG. 14, the axial elastic projections 81B are disposed on the second end surface 912 of the first collar 91. Alternatively, axial elastic projections (not shown) which are disposed on the first end surface 921 of the second collar 92 may butt against the second end surface 912 of the first collar 91.

In the third embodiment of FIG. 14, the second collar 92 is received by the lower plate 93 which is the member suspended by the suspension mechanisms T1, T2. Alternatively, the second end surface 922 of the second collar 92 may be received by a step portion (not shown) which is disposed in the inner circumference of the second resin-pin passing hole 67 of the second plate 32 (corresponding to the member suspended by the suspension mechanisms T1, T2).

Fourth Embodiment

Figure 15:
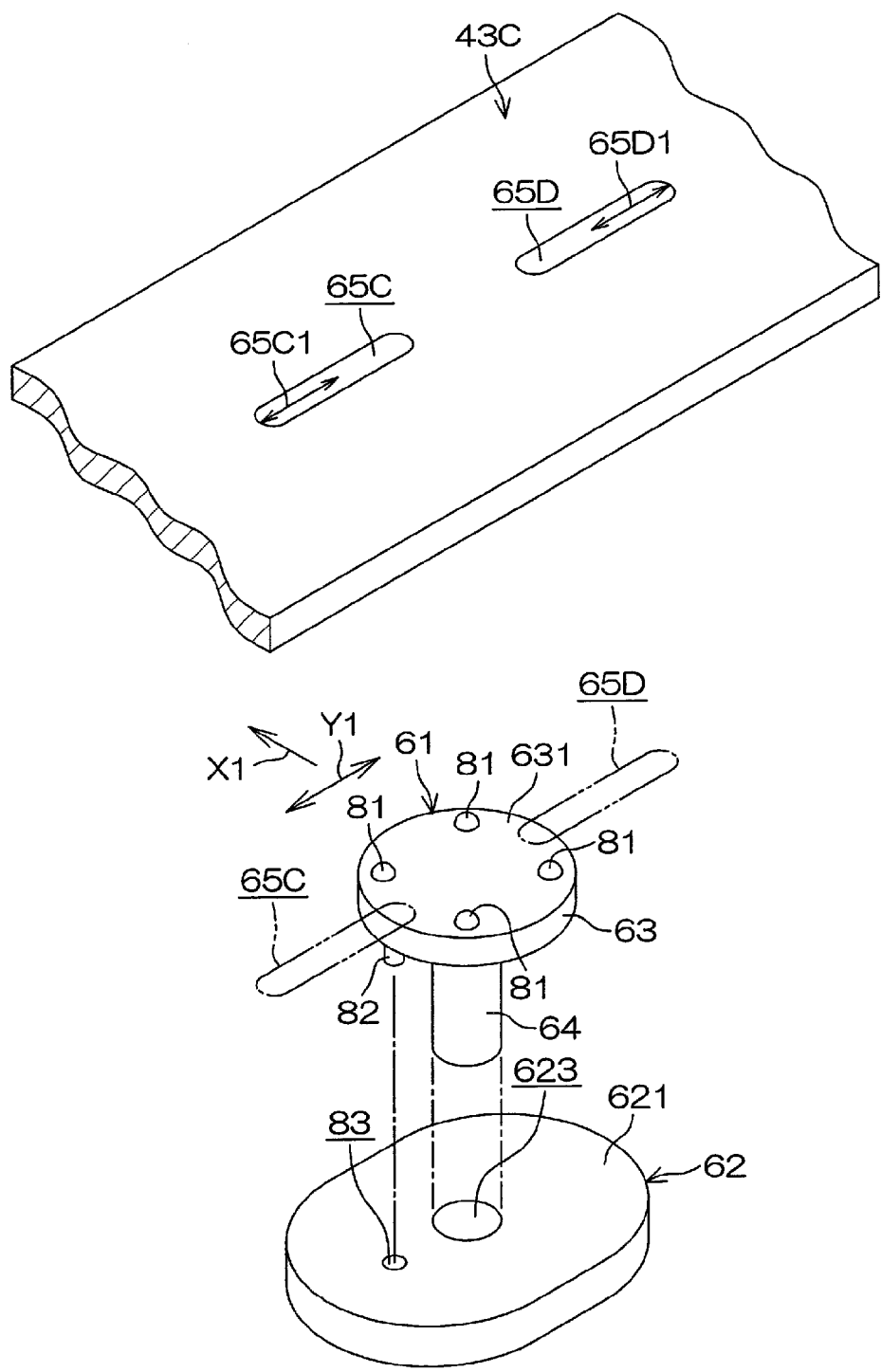
FIG. 15 is an exploded perspective view of a slide plate, and a resin pin and collar in a coupling/decoupling mechanism in a fourth embodiment of the invention.
Figure 16:
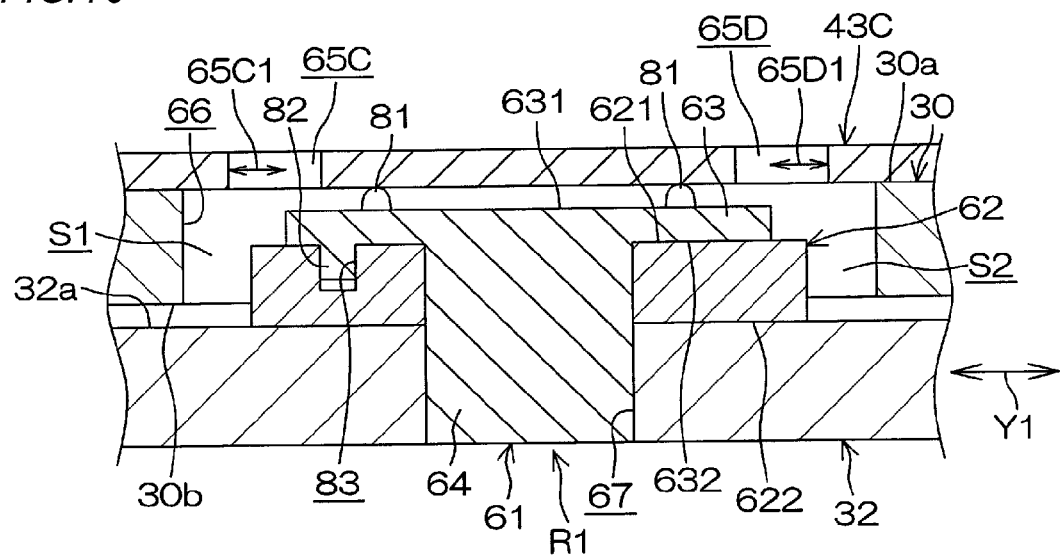
FIG. 16 is a sectional view of a coupled state of first and second plates in the fourth embodiment, and shows a section in the lateral direction (direction perpendicular to a column movement direction) including the axis of the resin pin.

Next, FIG. 15 is an exploded perspective view of a slide plate 43C, and the resin pin 61 and collar 62 in the coupling/decoupling mechanism R1 in a fourth embodiment of the invention. FIG. 16 is a sectional view of a coupled state of the first plate 30 and the second plate 32 in the fourth embodiment, and shows a section in the lateral direction (direction Y1 perpendicular to the column movement direction X1) including the axis of the resin pin 61.

The fourth embodiment of FIGS. 15 and 16 is a modified embodiment of the first embodiment of FIGS. 7 and 8, and therefore only configurations different from those of the first embodiment will be described in the description of the fourth embodiment. Referring to FIGS. 15 and 16, the fourth embodiment is different from the first embodiment of FIGS. 7 and 8 in the following point. In the first embodiment, the single resin-pin visual check hole 65 formed by a circular hole is disposed in the slide plate 43. In the fourth embodiment, by contrast, a pair of resin-pin visual check holes 65C, 65D which are configured by long holes that extend in the direction Y1 perpendicular to the column movement direction X1 are formed in the slide plate 43C.

The pair of resin-pin visual check holes 65C, 65D are separated from each other in the direction Y1 that is perpendicular to the column movement direction X1. The elastic projections 81 of the first surface 631 of the head flange 63 of the resin pin 61 are placed at positions which avoid a range where, in a secondary collision, the pair of resin-pin visual check holes 65C, 65D are passed in the column movement direction X1. In a secondary collision, specifically, the elastic projections 81 pass between the pair of resin-pin visual check holes 65C, 65D.

The collar 62 is laterally longer than the head flange 63 of the resin pin 61, and protrudes from the both sides of the head flange 63 in the lateral direction (direction Y1 that is perpendicular to the column movement direction X1). The pair of resin-pin visual check holes 65C, 65D include collar visual check regions 65C1, 65D1 through which a part of the collar 62 can be visually checked, respectively. Namely, a part of the first surface 631 of the head flange 63 of the resin pin 61, and that of the first end surface 621 of the collar 62 are visually checked through the resin-pin visual check holes 65C, 65D, respectively.

According to the fourth embodiment, similarly with the first embodiment of FIG. 8, an influence due to catching in a secondary collision between the axial elastic projections 81 of the resin pin 61 and the resin-pin visual check holes 65C, 65D on the releasing load (increase of the releasing load) can be suppressed.

Through the resin-pin visual check holes 65C, 65D including the collar visual check regions 65C1, 65D1, it is possible to check not only whether the resin pin 61 is attached or not (whether a missing part exists or not), but also whether the collar 62 is attached or not (whether a missing part exists or not). Consequently, it is possible to achieve a steering device in which the defect rate is low.

One of the pair of resin-pin visual check holes 65C, 65D may be omitted. The shapes of the resin-pin visual check holes 65C, 65D may not be a long hole but a circular hole or a polygonal hole as far as the shapes enable a part of the resin pin 61 and that of the collar 62 to be visually checked.

Fifth Embodiment

Figure 17:
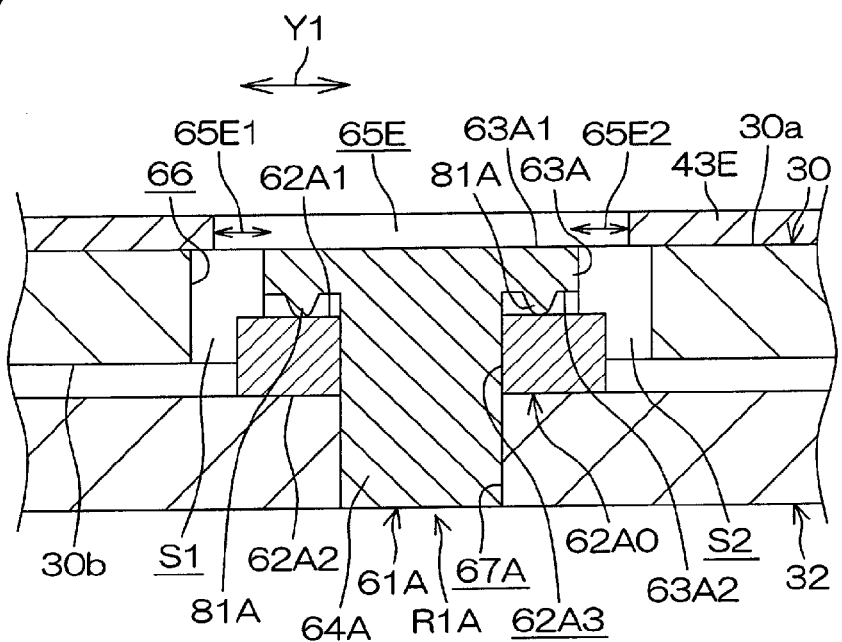
FIG. 17 is a sectional view of a coupled state of first and second plates in a fifth embodiment of the invention, and shows a section in the lateral direction (direction perpendicular to a column movement direction) including the axis of a resin pin.

Next, FIG. 17 is a sectional view of a coupled state of the first plate 30 and the second plate 32 in a fifth embodiment of the invention, and shows a section in the lateral direction (direction Y1 perpendicular to the column movement direction X1) including the axis of the resin pin 61A.

The fifth embodiment of FIG. 17 is a modified embodiment of the second embodiment of FIG. 12 showing the section in the column movement direction X1, and therefore only configurations different from those of the second embodiment will be described in the description of the fifth embodiment. In the fifth embodiment, referring to FIG. 17, a slide plate 43E forms a resin-pin visual check hole 65E configured by a long hole which extends in the direction Y1 perpendicular to the column movement direction X1.

The outer diameter of a collar 62A0 is made larger than that of the head flange 63A of the resin pin 61A. The resin-pin visual check hole 65E includes a pair of collar visual check regions 65E1, 65E2 through which a part of the collar 62 can be visually checked, at the both ends in the longitudinal direction. Namely, a part of the first surface 63A1 of the head flange 63A of the resin pin 61A, and that of the first end surface 62A1 of the collar 62A0 are visually checked through the resin-pin visual check hole 65E including the collar visual check regions 65E1, 65E2.

In the components of the fifth embodiment of FIG. 17, the components which are identical with the components of the second embodiment of FIG. 12 are denoted by the same reference numerals as those for the components of the second embodiment of FIG. 12.

According to the fifth embodiment, similarly with the second embodiment of FIG. 12, the catch of the axial elastic projections 81A disposed on the second surface 63A2 which is not opposed to the slide plate 43E, in the resin-pin visual check hole 65E can never happen. Therefore, an influence due to the above-described catch on the releasing load (increase of the releasing load) can be suppressed.

Through the resin-pin visual check hole 65E including the collar visual check regions 65E1, 65E2, it is possible to check not only whether the resin pin 61A is attached or not (whether a missing part exists or not), but also whether the collar 62A0 is attached or not (whether a missing part exists or not). Consequently, it is possible to achieve a steering device in which the defect rate is low.

The resin-pin visual check hole 65E may be a long hole which extends in the column movement direction X1. One of the pair of collar visual check regions 65E1, 65E2 of the resin-pin visual check hole 65E may be omitted. The shape of the resin-pin visual check hole 65E may not be a long hole but a circular hole or a polygonal hole as far as the shape enables a part of the resin pin 61A and that of the collar 62A0 to be visually checked.

Sixth Embodiment

Figure 18:
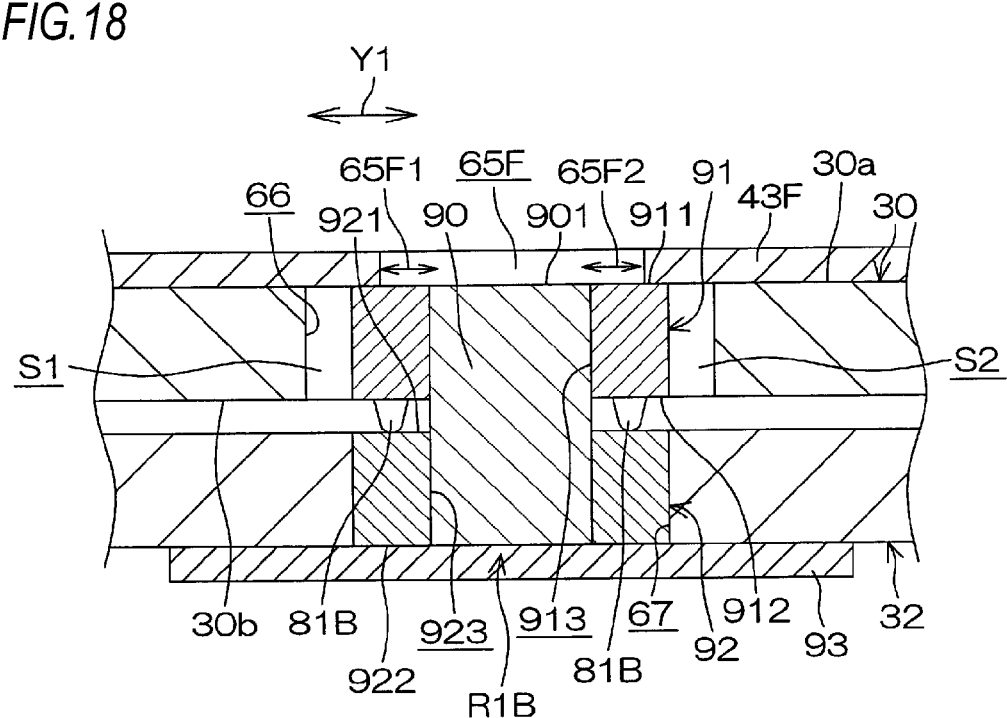
FIG. 18 is a sectional view of a coupled state of first and second plates in a sixth embodiment of the invention, and shows a section in the lateral direction (direction perpendicular to a column movement direction) including the axis of a resin pin.

Next, FIG. 18 is a sectional view of a coupled state of the first plate 30 and second plate 32 in a sixth embodiment of the invention, and shows a section in the lateral direction (direction Y1 perpendicular to the column movement direction X1) including the axis of the resin pin 90.

The sixth embodiment of FIG. 18 is a modified embodiment of the third embodiment of FIG. 14 showing the section in the column movement direction X1, and therefore only configurations different from those of the third embodiment will be described in the description of the sixth embodiment. In the sixth embodiment, referring to FIG. 18, a slide plate 43F forms a resin-pin visual check hole 65F configured by a long hole which extends in the direction Y1 perpendicular to the column movement direction X1.

The resin-pin visual check hole 65F includes a pair of collar visual check regions 65F1, 65F2 through which a part of the first collar 91 can be visually checked, at the both ends in the longitudinal direction. Namely, a part of the first end surface 901 of the resin pin 90, and that of the first end surface 911 of the first collar 91 are visually checked through the resin-pin visual check hole 65F including the collar visual check regions 65F1, 65F2.

In the components of the sixth embodiment of FIG. 18, the components which are identical with the components of the third embodiment of FIG. 14 are denoted by the same reference numerals as those for the components of the third embodiment of FIG. 14.

According to the sixth embodiment, similarly with the third embodiment of FIG. 14, the catch of the axial elastic projections 81B in the resin-pin visual check hole 65F can never happen. Therefore, an influence due to the above-described catch on the releasing load (increase of the releasing load) can be suppressed.

Through the resin-pin visual check hole 65F including the collar visual check regions 65F1, 65F2, it is possible to check not only whether the resin pin 90 is attached or not (whether a missing part exists or not), but also whether the first collar 91 is attached or not (whether a missing part exists or not). Consequently, it is possible to achieve a steering device in which the defect rate is low.

The resin-pin visual check hole 65F may be a long hole which extends in the column movement direction X1. One of the pair of collar visual check regions 65F1, 65F2 of the resin-pin visual check hole 65F may be omitted. The shape of the resin-pin visual check hole 65F may not be a long hole but a circular hole or a polygonal hole as far as the shape enables a part of the resin pin 90 and that of the first collar 91 to be visually checked.

Seventh Embodiment

Figure 19:
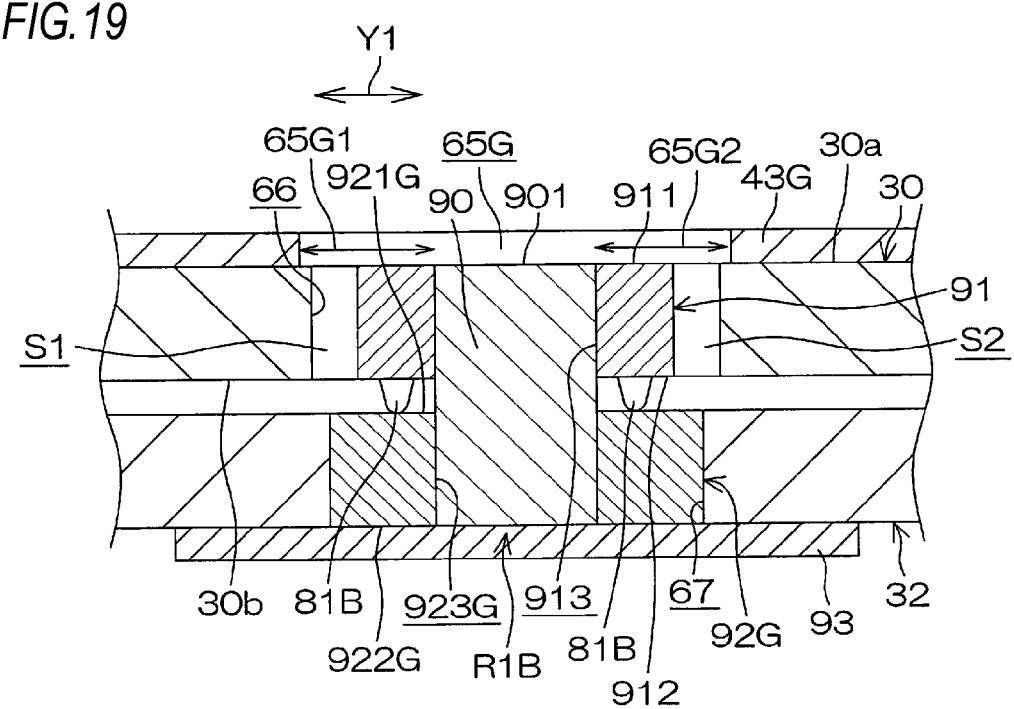
FIG. 19 is a sectional view of a coupled state of first and second plates in a seventh embodiment of the invention, and shows a section in the lateral direction (direction perpendicular to a column movement direction) including the axis of a resin pin.

Next, FIG. 19 is a sectional view of a coupled state of the first plate 30 and second plate 32 in a seventh embodiment of the invention, and shows a section in the lateral direction (direction Y1 perpendicular to a column movement direction X1) including the axis of the resin pin 90.

The seventh embodiment of FIG. 19 is a modified embodiment of the sixth embodiment of FIG. 18, and therefore only configurations different from those of the sixth embodiment will be described in the description of the seventh embodiment. In the seventh embodiment, referring to FIG. 19, the outer diameter of a second collar 92G is made larger than that of the first collar 91. The second collar 92G has a first end surface 921G, second end surface 922G, and center hole 923G which correspond to the first end surface 921, second end surface 922, and center hole 923 of the second collar 92 of the sixth embodiment of FIG. 18, respectively.

A slide plate 43G forms a resin-pin visual check hole 65G configured by a long hole which extends in the direction Y1 perpendicular to the column movement direction X1. The resin-pin visual check hole 65G includes a pair of collar visual check regions 65G1, 65G2 through which a part of the first collar 91 and that of the second collar 92G can be visually checked, at the both ends in the longitudinal direction. Namely, a part of the first end surface 901 of the resin pin 90, that of the first end surface 911 of the first collar 91, and that of the first end surface 921G of the second collar 92G are visually checked through the resin-pin visual check hole 65G including the collar visual check regions 65G1, 65G2.

In the components of the seventh embodiment of FIG. 19, the components which are identical with the components of the sixth embodiment of FIG. 18 are denoted by the same reference numerals as those for the components of the sixth embodiment of FIG. 18.

According to the seventh embodiment, similarly with the sixth embodiment of FIG. 18, the catch of the axial elastic projections 81B in the resin-pin visual check hole 65G can never happen. Therefore, an influence due to the above-described catch on the releasing load (increase of the releasing load) can be suppressed.

Through the resin-pin visual check hole 65G including the collar visual check regions 65G1, 65G2, it is possible to check not only whether the resin pin 90 is attached or not (whether a missing part exists or not), but also whether the first collar 91 and the second collar 92G are attached or not (whether a missing part exists or not). Consequently, it is possible to achieve a steering device in which the defect rate is low.

The resin-pin visual check hole 65G may be a long hole which extends in the column movement direction X1. One of the pair of collar visual check regions 65G1, 65G2 of the resin-pin visual check hole 65G may be omitted. The shape of the resin-pin visual check hole 65G may not be a long hole but a circular hole or a polygonal hole as far as the shape enables a part of the resin pin 90, that of the first collar 91, and that of the second collar 92 to be visually checked.

Eighth Embodiment

Figure 20:
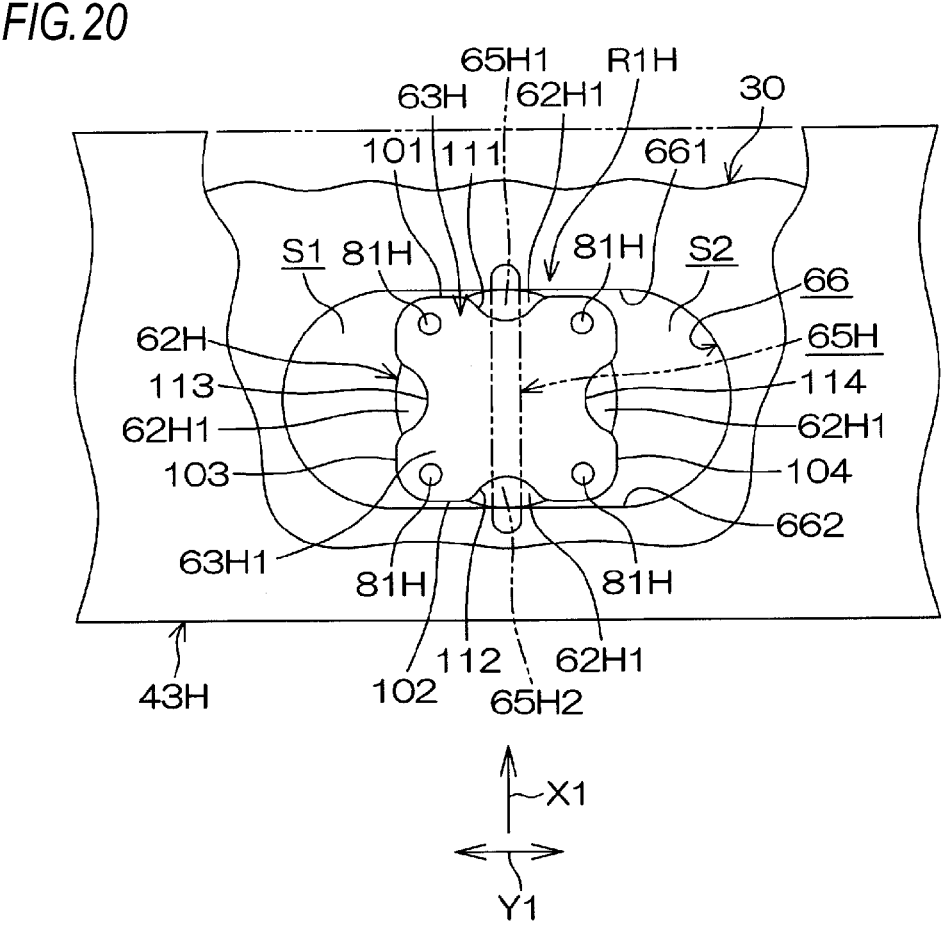
FIG. 20 is a partially cutaway schematic plan view of a slide plate, and a resin pin and collar in a coupling/decoupling mechanism in an eighth embodiment of the invention.

Next, FIG. 20 is a schematic plan view of a coupling/decoupling mechanism R1H in an eighth embodiment of the invention. The eighth embodiment of FIG. 20 is a modified embodiment of the first embodiment of FIG. 6, and therefore only configurations different from those of the first embodiment will be described in the description of the eighth embodiment.

Referring to FIG. 20, a head flange 63H of a resin pin 61H has a rectangular shape in which the four corners are chamfered. The outer circumference of the head flange 63H is fitted into the first resin-pin passing hole 66 of the first plate 30 while providing a slight play in the direction of rotation about the axis of the resin pin 61H. Axial elastic projections 81H are projectedly formed in the four corners of a first surface 63H1 of the head flange 63H.

Among four flat portions 101, 102, 103, 104 (corresponding to the four side portions of a rectangle) of the outer circumference of the head flange 63H, the pair of flat portions 101, 102 which are opposed to each other in the column movement direction X1 are engaged with a pair of flat portions 661, 662 extending in the longitudinal direction of the inner circumference of the first resin-pin passing hole 66 of the first plate 30, respectively, whereby rotation of the resin pin 61H is restricted. That is, the resin pin 61H is restricted from being rotated, directly by the first resin-pin passing hole 66 of the first plate 30 without using the collar 62H.

On the other hand, the outer circumference of the collar 62H has a circular shape, and is engaged in a rotatable state with the pair of flat portions 661, 662 of the first resin-pin passing hole 66 of the first plate 30. The collar 62H is not restricted from being rotated, by the first resin-pin passing hole 66 of the first plate 30.

Cutout concave portions 111 to 114 are formed in middle portions of the flat portions 101 to 104 of the outer circumference of the head flange 63H, respectively. The pair of cutout concave portions 111, 112 are opposed to each other in the column movement direction X1, and the other pair of cutout concave portions 113, 114 are opposed to each other in the direction Y1 perpendicular to the column movement direction X1.

The slide plate 43H includes a resin-pin visual check hole 65H configured by a long hole which extends in the column movement direction X1. The resin-pin visual check hole 65H includes a pair of collar visual check regions 65H1, 65H2 which enable a first end surface 62H1 of the collar 62H to be visually checked through the pair of cutout concave portions 111, 112 of the head flange 63H of the resin pin 61H, respectively, at the both ends in the longitudinal direction.

In the components of the eighth embodiment of FIG. 20, the components which are identical with the components of the first embodiment of FIG. 6 are denoted by the same reference numerals as those for the components of the first embodiment of FIG. 6.

According to the eighth embodiment, similarly with the first embodiment of FIG. 6, the catch of the axial elastic projections 81H in the resin-pin visual check hole 65H can never happen. Therefore, an influence due to the above-described catch on the releasing load (increase of the releasing load) can be suppressed.

Through the resin-pin visual check hole 65H including the collar visual check regions 65H1, 65H2, it is possible to check not only whether the resin pin 61H is attached or not (whether a missing part exists or not), but also whether the collar 62H is attached or not (whether a missing part exists or not). Consequently, it is possible to achieve a steering device in which the defect rate is low.

Moreover, the resin pin 61H is restricted from being rotated, directly by the first resin-pin passing hole 66 of the first plate 30. Unlike the first embodiment of FIG. 7, therefore, it is not necessary to dispose rotation restricting elements (the rotation restricting convex portion 82 and the rotation restricting concave portion 83) which restrict rotation of the resin pin 61, between the collar 62 and the resin pin 61, and hence the structure can be simplified.

The resin-pin visual check hole 65H may be configured as a long hole which extends in the direction Y1 perpendicular to the column movement direction X1, and the first end surface 62H1 of the collar 62H may be visually checked through the pair of cutout concave portions 113, 114, as far as the elastic projections 81H are placed at positions which avoid a range where, in a secondary collision, the resin-pin visual check hole 65H is passed in the column movement direction X1. One of the pair of collar visual check regions 65H1, 65H2 of the resin-pin visual check hole 65H may be omitted. The shape of the resin-pin visual check hole 65H may not be a long hole but a circular hole or a polygonal hole as far as the shape enables a part of the resin pin 61H and that of the collar 62H to be visually checked.

The invention is not limited to the above-described embodiments, and may be modified in various manners within the scope defined by the claims of the invention.

The application is based on Japanese Patent Application (No. 2013-149594) filed Jul. 18, 2013 and Japanese Patent Application (No. 2013-189507) filed Sep. 12, 2013, and their disclosures are incorporated herein by reference.

INDUSTRIAL APPLICABILITY

According to the invention, it is possible to realize a steering device in which, in a secondary collision, an axial elastic projection of a resin pin can be suppressed from being caught in a resin-pin visual check hole.

DESCRIPTION OF THE REFERENCE NUMERALS AND SIGNS

1 . . . steering device, 2 . . . a steering member, 3 . . . steering shaft, 13 . . . vehicle body-side member, 15 . . . steering column, 16 . . . upper jacket (movable jacket), 23 . . . stationary bracket, 24 . . . tilt bracket (movable bracket), 25 . . . suspension bolt, 30 . . . first plate, 31 . . . first bolt passing hole, 32 . . . second plate (member suspended by suspension mechanism), 33 . . . second bolt passing hole, 34 . . . nut, 42 . . . plate spring, 43; 43C; 43E; 43F; 43G; 43H . . . slide plate, 44 . . . third bolt passing hole, 61; 61A; 61H . . . resin pin, 62; 62A; 62H . . . collar, 621; 62A1; 62H1 . . . first end surface, 63; 63A; 63H . . . head flange, 631, 63A1, 63H1 . . . first surface, 632; 63A2 . . . second surface, 64; 64A . . . shaft portion, 65; 65C, 65D; 65E; 65F; 65G; 65H . . . resin-pin visual check hole, 65C1, 65D1; 65E1, 65E2; 65F1, 65F2; 65G1, 65G2; 65H1, 65H2 . . . collar visual check region, 66 . . . first resin-pin passing hole, 661, 662 . . . flat portion, 67 . . . second resin-pin passing hole, 81; 81A; 81B . . . (axial) elastic projection, 82 . . . rotation restricting convex portion, 83 . . . rotation restricting concave portion, 90 . . . resin pin, 901 . . . first end surface, 91 . . . first collar, 912 . . . second end surface (opposing surface), 92; 92G . . . second collar, 921; 921G . . . first end surface (opposing surface), 93 . . . lower plate (member suspended by suspension mechanism), 101 to 104 . . . flat portion, 111 to 114 . . . cutout concave portion, R1; R1A; R1B; R1H . . . coupling/decoupling mechanism, T1, T2 . . . suspension mechanism, X1 . . . column movement direction, Y1 . . . direction perpendicular to column movement direction

The invention claimed is:

1. A steering device comprising:
a stationary bracket which is fixed to a vehicle body-side member, and which includes a first plate in which a first resin-pin passing hole, and a first bolt passing hole configured by a long hole that extends in a column movement direction in a secondary collision are formed;
a movable jacket which is configured to rotatably support a steering shaft in which a steering member is coupled to one end;
a movable bracket which is configured to support the movable jacket in a manner that, in a secondary collision, the movable bracket is moved together with the movable jacket in the column movement direction, and which includes a second plate that is opposed to a lower surface of the first plate, the second plate in which a second resin-pin passing hole and a second bolt passing hole are formed;
a suspension mechanism which includes: a slide plate in which a third bolt passing hole and a resin-pin visual check hole are formed along an upper surface of the first plate; and a suspension bolt which is passed sequentially through the third bolt passing hole, the first bolt passing hole, and the second bolt passing hole to couple the first plate and the second plate together, thereby suspending the movable jacket through the movable bracket, the suspension mechanism which is movable in a corresponding column movement direction in a secondary collision;
a resin pin which has an axial end surface opposed to the resin-pin visual check hole, which is passed through the first resin-pin passing hole and the second resin-pin passing hole to couple the second plate to a predetermined position of the first plate, and which, in a secondary collision, is configured to cause the second plate to release from the predetermined position in the column movement direction; and
a collar which is fitted to the resin pin in a state where the collar is received directly or indirectly by a member that is suspended by the suspension mechanism, and which is higher in hardness than the resin pin, wherein,
in one of the resin pin and the collar, an elastic projection which is configured to directly or indirectly urge the slide plate, and which projects in an axial direction is disposed at a position avoiding a range where, in a secondary collision, the resin-pin visual check hole is passed in the column movement direction.

2. The steering device according to claim 1, wherein
an inner circumference of the first resin-pin passing hole, and an outer circumference of the collar are formed into a laterally long shape which extends in a direction that is perpendicular to the column movement direction, thereby causing rotation of the collar to be restricted by the first resin-pin passing hole,
the resin pin includes: a shaft portion which is passed through the collar; and a head flange which is coupled to one end of the shaft portion,
the head flange has: a first surface which is opposed to the slide plate; and a second surface which is opposed to an end surface of the collar,
the elastic projection is placed at a position avoiding the resin-pin visual check hole in the first surface of the head flange, and
a rotation restricting convex portion which is disposed on at least one of the second surface of the head flange and the end surface of the collar is fitted to a rotation restricting concave portion which is disposed on the other surface, thereby restricting relative rotation of the resin pin and the collar.

3. The steering device according to claim 1, wherein
the resin pin includes: a shaft portion which is passed through the collar; and a head flange which is coupled to one end of the shaft portion,
an inner circumference of the first resin-pin passing hole includes a flat portion which is engaged with a flat portion disposed on an outer circumference of the head flange, thereby restricting rotation of the resin pin,
the head flange has: a first surface which is opposed to the slide plate; and a second surface which is opposed to an end surface of the collar, and
the elastic projection is placed at a position avoiding the resin-pin visual check hole in the first surface of the head flange.

4. The steering device according to claim 1, wherein
the resin pin includes: a shaft portion which is passed through the collar; and a head flange which is coupled to one end of the shaft portion, the head flange has: a first surface which is opposed to the slide plate; and a second surface which is opposed to an end surface of the collar, and the elastic projection is disposed on the second surface of the head flange.

5. The steering device according to claim 1, wherein the collar includes: a first collar which is placed in the first resin-pin passing hole, and which is press-fitted to the resin pin; and a second collar which is placed in the second resin-pin passing hole, and which is loose-fitted to the resin pin, and the elastic projection is disposed on at least one of opposing surfaces the first collar and the second collar.

6. The steering device according to claim 1, wherein the resin-pin visual check hole includes a collar visual check region through which a part of the collar can be visually checked.

* * * * *